(12) United States Patent
Farag et al.

(10) Patent No.: US 8,041,141 B2
(45) Date of Patent: Oct. 18, 2011

(54) METHOD AND SOFTWARE FOR SHAPE REPRESENTATION WITH CURVE SKELETONS

(75) Inventors: Aly A. Farag, Louisville, KY (US); M. Sabry Hassouna, Eden Prairie, MN (US)

(73) Assignee: The University of Louisville Research Foundation, Inc., Louisville, KY (US)

( * ) Notice: Subject to any disclaimer, the term of this patent is extended or adjusted under 35 U.S.C. 154(b) by 1055 days.

(21) Appl. No.: 11/823,738

(22) Filed: Jun. 28, 2007

(65) Prior Publication Data

US 2008/0018646 A1    Jan. 24, 2008

Related U.S. Application Data

(60) Provisional application No. 60/818,006, filed on Jun. 30, 2006.

(51) Int. Cl.
*G06K 9/42* (2006.01)
*G06K 9/44* (2006.01)
*G06T 17/00* (2006.01)
*G06T 11/00* (2006.01)
*G09G 5/24* (2006.01)

(52) U.S. Cl. ........ 382/259; 382/258; 382/256; 345/424; 345/469.1; 345/470

(58) Field of Classification Search .................. 382/259; 345/424
See application file for complete search history.

(56) References Cited

U.S. PATENT DOCUMENTS 5,499,322 A * 3/1996 Thirion et al. ................ 345/418
5,734,384 A * 3/1998 Yanof et al. .................... 345/424
(Continued)

FOREIGN PATENT DOCUMENTS
WO      WO 03/052458 A1      6/2003

OTHER PUBLICATIONS

I. Bitter et al. "Penalized-Distance Volumetric Skeleton Algorithm", *IEEE Transactions on Visualization and Computer Graphics*, vol. 7, No. 3, Jul.-Sep. 2001, pp. 195-206.

(Continued)

*Primary Examiner* — Bhavesh Mehta
*Assistant Examiner* — Michelle Entezari
(74) *Attorney, Agent, or Firm* — Greer, Burns & Crain Ltd.

(57) ABSTRACT

Embodiments of the invention utilize a variational framework for computing curve skeletons (CS) of objects whose cross section is not necessary tubular. Embodiments utilize an energy function, which is proportional to some medialness function, such that the minimum cost path between any two medial voxels in the shape is a curve skeleton. Different medialness functions include the Euclidean distance field and a modified version of the magnitude of the gradient vector flow (GVF), which results in two different energy functions. The first energy function controls the identification of the topological nodes of the shape from which curve skeletons start, while the second one controls the extraction of the curve skeletons. Preferred embodiments are completely automated since all parameters are analytically estimated. Embodiments are highly less sensitive to boundary noise, are able to extract the entire curve skeletons, as well as only part of it given the starting and the end voxels, and do not require voxels to be isotropic. In addition, computed curve skeletons are highly centered and form a connected graph. Preferred embodiments have been validated the framework both quantitatively and qualitatively against several 3D shapes of different complexity.

7 Claims, 11 Drawing Sheets

U.S. PATENT DOCUMENTS

| | | | | |
|---|---|---|---|---|
| 6,157,750 | A * | 12/2000 | Choi et al. | 382/301 |
| 6,362,821 | B1 * | 3/2002 | Gibson et al. | 345/424 |
| 6,496,188 | B1 * | 12/2002 | Deschamps et al. | 345/419 |
| 6,771,262 | B2 * | 8/2004 | Krishnan | 345/424 |
| 6,967,653 | B2 * | 11/2005 | Wittenbrink et al. | 345/440 |
| 7,016,521 | B1 * | 3/2006 | Florent | 382/128 |
| 7,167,583 | B1 * | 1/2007 | Lipson et al. | 382/147 |
| 7,177,480 | B2 * | 2/2007 | Ikeda et al. | 382/259 |
| 7,526,131 | B2 * | 4/2009 | Weber | 382/199 |
| 7,590,268 | B1 * | 9/2009 | Skirko | 382/118 |
| 7,830,378 | B2 * | 11/2010 | Inoue et al. | 345/424 |
| 7,928,983 | B2 * | 4/2011 | Pedersen et al. | 345/442 |
| 2002/0097912 | A1 * | 7/2002 | Kimmel et al. | 382/199 |
| 2003/0112704 | A1 | 6/2003 | Goff et al. | |
| 2004/0209234 | A1 | 10/2004 | Geiger | |
| 2008/0069445 | A1 * | 3/2008 | Weber | 382/181 |

OTHER PUBLICATIONS

J. Chuang et al. "Skeletonization of Three-Dimensional Object Using Generalized Potential Field" *IEEE Transactions of Pattern Analysis and Machine Intelligence*, vol. 22, No. 11, Nov. 2000, pp. 1241-1251.

N.D. Cornea et al. "Curve-Skeleton Properties, Applications and Algorithms", pp. 1-20, 2007.

T.K. Dey "Defining and Computing Curve-skeletons with Medical Geodesic Function", *Eurographics Symposium on Geometry Processing* (2006), pp. 1-20.

N. Gagvani et al., "Parameter Controlled Skeletonization of Three Dimensional Objects", *Technical Report CAIP-TR-216*, Jun. 3, 1997, pp. 1-19.

M.S. Hassouna et al. "On the Extraction of Curve Skeletons Using Gradient Vector Flow," Proc. of IEEE International Conference on Computer Vision (ICCV'07), Rio de Janeiro, Brazil, Oct. 14-20, 2007.

M.S. Hassouna et al., "Variational Curve Skeltons", pp. 1-35, not published.

M.S. Hassouna et al., "Robust Centerline Extraction Framework Using Level Sets", *in Proc. of IEEE Conference on Computer Vision and Pattern Recognition* (*CVPR*), San Diego, CA, Jun. 2005, pp. 458-465.

W. Ma et al., "Skeleton Extraction of 3D Objects with Radial Basis Functions", Proceedings of the Shape Modeling International 2003 (SMI'03) 2003 IEEE, pp. 1-10.

A. Telea et al., "A Robust Level-Set Algorithm for Centerline Extraction", *Joint Eurographics—IEEE TCVG Symposium on Visualization* (2003), pp. 1-11.

F. Wu et al. "Skeleton Extraction of 3D Objects with Visible Repulsive Force", Eurographics Symposium on Geometry Processing (2003), pp. 1-7.

F. Xu, "Extracting Generalised Cylinder Models of Dendritic Trees from 3-D Image Stacks", *SPIE*, vol. 3261, pp. 149-158, 1998.

\* cited by examiner

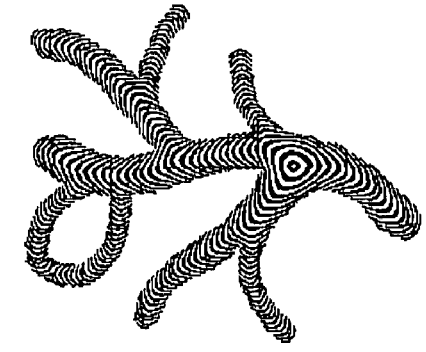
FIG. 8(d) τ = 0.025
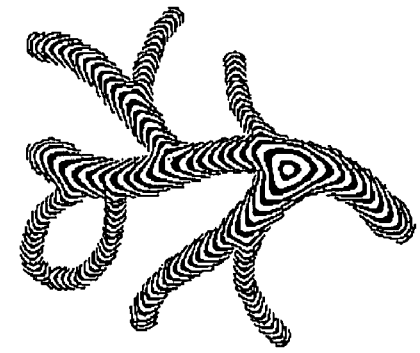
FIG. 8(c) τ = 0.05
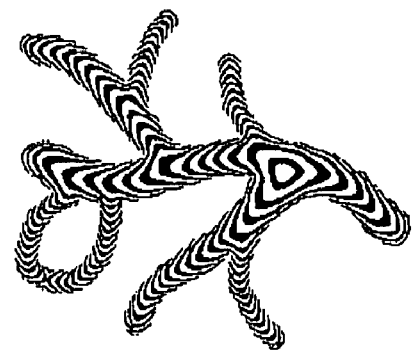
FIG. 8(b) τ = 0.1
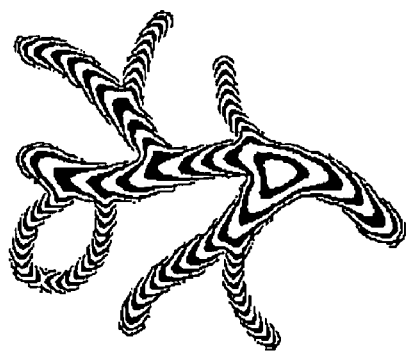
FIG. 8(a) τ = 0.2

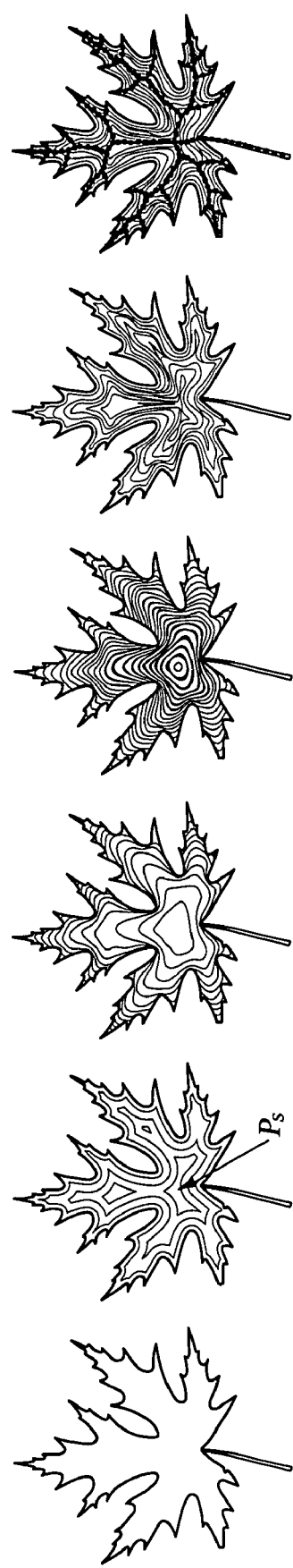

METHOD AND SOFTWARE FOR SHAPE REPRESENTATION WITH CURVE SKELETONS

CLAIM FOR PRIORITY AND REFERENCE TO RELATED APPLICATION

This application claims priority under 35 U.S.C. §119 from prior provisional application Ser. No. 60/818,006, filed Jun. 30, 2006.

FIELD

A field of the invention is pattern recognition and image analysis. Example applications of the invention include computer graphics, medical imaging, shape recognition, virtual reality, and robotic vision.

BACKGROUND

Shape is the lowest common denominator in describing objects, and hence plays an important part in the processing of visual information. Many powerful techniques depend upon the accurate representation of shape. For example, advances in three dimensional hardware acquisition devices, such as digitizers, magnetic resonance imaging systems, computed tomography devices, and laser scanners permit reconstruction of high quality three dimensional models of objects that have to be analyzed or visualized in a concise way. Such models can be described by their color, texture, and shape information, but color and texture (photometric data) are not always available depending on the reconstruction method or acquisition technique. Shape, on the other hand, needs to be accurately modeled, and the efficiency, accuracy, speed, etc., of the modeling of shape directly affect the utility of any system that makes use of a particular model for shape.

An important approach for representing the structure of a shape is to reduce it to a graph. Several methods have been proposed to reduce a shape into a graph, which can be classified into two main categories Reeb graph-based methods and Skeletal graph-based methods. The idea of Reeb graph is to construct a continuous function, usually a height function from one boundary source point to describe the topological structure and reveal the topological changes such as splitting and merging. Unfortunately, this type of graph does not capture the geometry of the shape.

Skeletal graph methods can capture the geometry of a shape. Skeletal graph-based methods compute a one-dimensional skeleton of an object and then convert it into a skeletal graph as its shape representation. A skeleton is a compact representation of a shape that maintains its topology. The concept of skeleton or medial axis was first introduced by Blum as the locus of centers of maximal disks in 2D or spheres in 3D that at least touch the boundary at two points. See, H. Blum, "A Transformation for Extracting New Descriptors of Shape," in Proc. Models for the Perception of Speech and Visual Form, W. Wathen-Dunn, Ed., Cambridge, Mass.: MIT Press, pp. 362-380 (November 1967). Each point of the skeleton is associated with a radius function that is the radius of its maximal disk/sphere. Therefore, the shape can be represented with less information than the original one. In addition, the shape can be fully recovered from its skeleton. Skeletal graph techniques, including the methods and software of the present invention, capture the topology of the shape and also its geometry.

A skeleton is a compact representation of a shape that maintains its topology. In general, the dimension of a skeleton is less than the dimension of the original object by at least one. For example, the skeleton of a 2D shape is a set of medial curves or centerlines. On the other hand, the skeleton of a 3D object is a set of medial surfaces. As a special case, for a 3D tubular object whose cross section is circular, the skeleton is a set of medial curves rather than medial surfaces. Reducing the dimensionality of the skeleton describing general shapes from medial surfaces to a set of medial curves is of importance in a wide range of applications. Example applications include virtual endoscopy, character animation and morphing, blood vessel analysis such as stenosis and aneurisms, object matching and retrieval, and collision detection. Medial curves are generally called curve skeletons (CS). A curve skeleton can be defined as a one-dimensional connected and smooth curve about which the object is locally symmetric.

Curve skeleton methods include topological thinning methods, distance transform methods, and potential field methods. The basic idea behind thinning methods is to iteratively peel off the object's boundary by identifying simple points, whose removal does not alter its topology. Curve skeletons are usually extracted by either checking the voxel's local neighborhood against a set of templates that prevents the deletion of topological nodes such as branch and end points or by pruning medial surfaces while preventing the removal of junctions between surfaces. Removal of simple points can be done either sequentially, in parallel, by following a specific direction, or by utilizing distance maps in governing the order of thinning. In general, thinning methods produce connected curve skeletons that preserve the object topology. However, preserving end points leads to many undesired small branches, which require post-processing.

The distance transform $D(x)$ computes at each voxel x its minimum distance from the object's boundary. $D(x)$ can be discretely approximated using chamfer metric (3,4,5), or continuously approximated using either the fast marching methods or the fast sweeping methods. The ridge voxels (singularities) of $D(x)$ are locally centered with respect to the object's boundary. Any distance transform-based method involves three main steps: generation of the distance field, detection of ridge voxels, and reconnection of voxels into curve skeletons. Zhou and Toga proposed a voxel coding technique, in which each voxel is assigned two codes; the distance to a manually selected seed point and the distance to the object's boundary. See, Y. Zhou and A. W. Toga, "Efficient skeletonization of volumetric objects," IEEE Transactions on Visualization and Computer Graphics, vol. 5, no. 3, pp. 196-209, 1999. Initially, curve skeletons are extracted as trajectories and then centered using some medialness function. The algorithm guarantees connected paths but not centeredness especially near branching nodes. Telea and Vilanova resampled the volumetric object along the major three axis; x, y, and z, resulting in three separate stacks of cross sections for the same object. See, A. Telea and A. Vilanova, "A robust level-set algorithm for centerline extraction," in VISSYM '03: Proceedings of the symposium on Data visualisation 2003, 2003, pp. 185-194. Then, a level set-based centerline extraction method is used to compute the medial point of each 2D cross section in each volume independently. Finally, the common points of the resultant sets of medial points form the final skeleton. The convergence of their method is not guaranteed because the actual topology of a 3D object cannot be interpreted from its 2D cross-sections. Deschamps et al., select the end points of a branch of interest manually and then a fast marching front propagates from the starting point with a speed that is a function of the distance transform until it reaches the end point. See, T. Deschamps and L. Cohen, "Fast extraction of minimal paths in 3d images and applications to virtual endoscopy," Medical Image Analysis, vol. 5, no. 4, 2001. Centerline paths are extracted using the gradient descent method. This worked well for tubular structures. However, for general shapes, whose cross sections are not perfectly tubular, the method generates the shortest paths rather than centered ones. Dey and Sun defined some medial geodesic function on the medial surface of the object, from which curve skeletons are extracted by erosion. See, T. K. Dey and J. Sun, "Defining and computing curve-skeletons with medial geodesic function," in Proc. Sympos. Geometry Processing, 2006, pp. 143-152. Although the method is promising for thin structures, the computed curve skeletons always oscillate around the desired ones.

In potential field methods, the Euclidean distance field is replaced with another continuous function that has some medial properties. Then, curve skeletons are identified as the field extremum points. Chaung et al., computed the Newtonian potential field as their potential function. See, J.-H. Chuang, C.-H. Tsai, and M.-C. Ko, "Skeletonization of three-dimensional object using generalized potential field," IEEE Trans. Pattern Anal. Mach. Intell., vol. 22, no. 11, pp. 1241-1251, 2000. Since their method is limited only to polygonal data, each vertex in the object is assumed to start a new curved skeleton, which is not practical assumption for noisy objects. Although generalizing the method to handle non polygonal data is possible, the computation of the potential function is very expensive because the potential value at every internal voxel of the object is a function of its entire boundary voxels. Cornea at al. extended the method to handle non-polygonal data. See, N. Cornea, D. Silver, X. Yuan, and R. Balasubramanian, "Computing hierarchical curve-skeletons of 3d objects." The Visual Computer, 2005. They computed the critical points and low divergence points of the field force to identify the starting point of each curved skeleton. Again, the computation of the potential field is still very expensive even on fast workstation. Also, due to visibility errors while computing the potential function or mis-computation of the critical field points, the final skeleton is not guaranteed to be either centered or connected.

In general, existing 3D extraction techniques of curve skeletons from volumetric objects suffer from at least one of the following limitations: (1) curve skeletons are extracted from medial surfaces by different pruning methods. Therefore, the accuracy of the former is a function of the extraction of the later; (2) they require manual interaction to select the starting point of each curve skeleton, (3) they are computationally expensive, (4) they require heuristics to handle branching nodes, (5) they are dedicated to a specific category of 3D objects, and hence lack of generality, and finally (6) they are sensitive to boundary noise.

Curve skeletons represent an object from image data. Once an object is represented by a curve skeleton, the object's representation can be used for many important functions. In medical imaging, computed curve skeletons can serve as flight paths in virtual endoscopy applications (e.g., colonoscopy, bronchoscopy, angioscopy, etc. In robotics, curve skeletons can serve as optimal planned paths (i.e., the shortest or the safest) for robotic navigation. In computer graphics, curve skeletons serve in the generation of the control skeleton and the skinning process (i.e., assigns each surface triangle to a part of the skeleton) for character animation. In computer vision, curve skeletons serve as a graph for 3D shape matching and retrieval.

Accurate, flexible curve skeletons make any application in which they are used more powerful. Some problems associated with techniques for computing curve skeletons include noise, speed, computational complexity, lack of generality, and lack of automation.

Farag et al., "Robust Centerline Extraction Framework Using Level Sets", Computer Vision & Pattern Recognition (CVPR), Jun. 20-26, 2005, provide a framework for computing centerlines of arbitrary 2D shapes and 3D tubular volumetric objects (e.g., stack of images), whose cross sections are nearly or perfectly circular. In this technique, an object centerline point is selected automatically as the point of global maximum Euclidean distance from the boundary, and is considered a point source Ps that transmits a wave front that evolves over time and traverses the object domain. The front propagates at each object point with a speed that is proportional to its Euclidean distance from the boundary. The motion of the front is governed by a nonlinear partial differential equation whose solution is computed efficiently using level set methods. Initially, the Ps transmits a moderate speed wave to explore the object domain and extract its topological information. Then, it transmits a new front that is much faster at centerline points than non central ones. As a consequence, centerlines intersect the propagating fronts at those points of maximum positive curvature. Centerlines are computed by tracking them, starting from each topological point until the Ps is reached, by solving an ordinary differential equation using an efficient numerical scheme. The technique is computationally inexpensive, and handles efficiently objects with complex topology such as loops. It is suitable for both 2D and 3D tubular objects. The computed centerlines are centered, connected, thin, and less sensitive to boundary noise. Extracted paths form a tree graph at no additional cost. However, there is no theoretical justification behind its speed model to guarantee convergence. Also, speed parameters are set heuristically and therefore prevent the framework from automation. Finally, the technique is limited to 3D objects having circular cross-sections.

A particular robotic vision navigation technique, is provided in Farag et al, "PDE Based Robust Robotic Navigation," Canadian Conference on Computer and Robot Vision (CRV), May 9-11, 2005. The robotic vision implementation in the present application is applicable for 2D robotic path planning. Its framework is general in the sense that it can be used for both 2D and 3D environments. It generates a collision-free optimum path for partial or complete configuration space. Optimum planned paths can be controlled according to the surrounding environment and running conditions in order to follow the safest, shortest, or the hybrid path. However, there is no theoretical justification behind its speed model to guarantee convergence. Also, the speed parameters are set heuristically and hence prevent the framework from automation.

SUMMARY OF THE INVENTION

Embodiments of the invention utilize a variational framework for computing curve skeletons (CS) of objects whose cross section is not necessary tubular. Embodiments utilize an energy function, which is proportional to some medialness function, such that the minimum cost path between any two medial voxels in the shape is a curve skeleton. Different medialness functions include a Euclidean distance field and a modified version of the magnitude of the gradient vector flow (GVF), which results in two different energy functions. The first energy function controls the identification of the topological nodes of the shape from which curve skeletons start, while the second one controls the extraction of the curve skeletons. Preferred embodiments are completely automated since all its parameters are analytically derived. Embodiments are highly less sensitive to boundary noise because it captures only the most prominent parts of the shape, are able to extract the entire curve skeletons, as well as only part of it given the starting and the end voxels, and do not require voxels to be isotropic. In addition, computed curve skeletons are highly centered and form a connected graph. Unlike competing techniques, methods of the invention do not have require steps to identify and classify medial junction nodes to compute and connect curve skeletons. Preferred embodiments have been validated the framework both quantitatively and qualitatively against several 3D shapes of different complexity.

BRIEF DESCRIPTION OF THE DRAWINGS

FIGS. 8(a)-8(d) show the level set graph of a synthetic shape under different values of $\tau$, respectively 0.2, 0.05, 0.0125, and 1.0, with the first two values being stable values and the second two being unstable values;

FIGS. 10(a)-10(f) graphically illustrate steps of a preferred dembodiment of the invention for representing a leaf shape with a curver skeleton.

DETAILED DESCRIPTION OF THE PREFERRED EMBODIMENTS

Figure 1A:
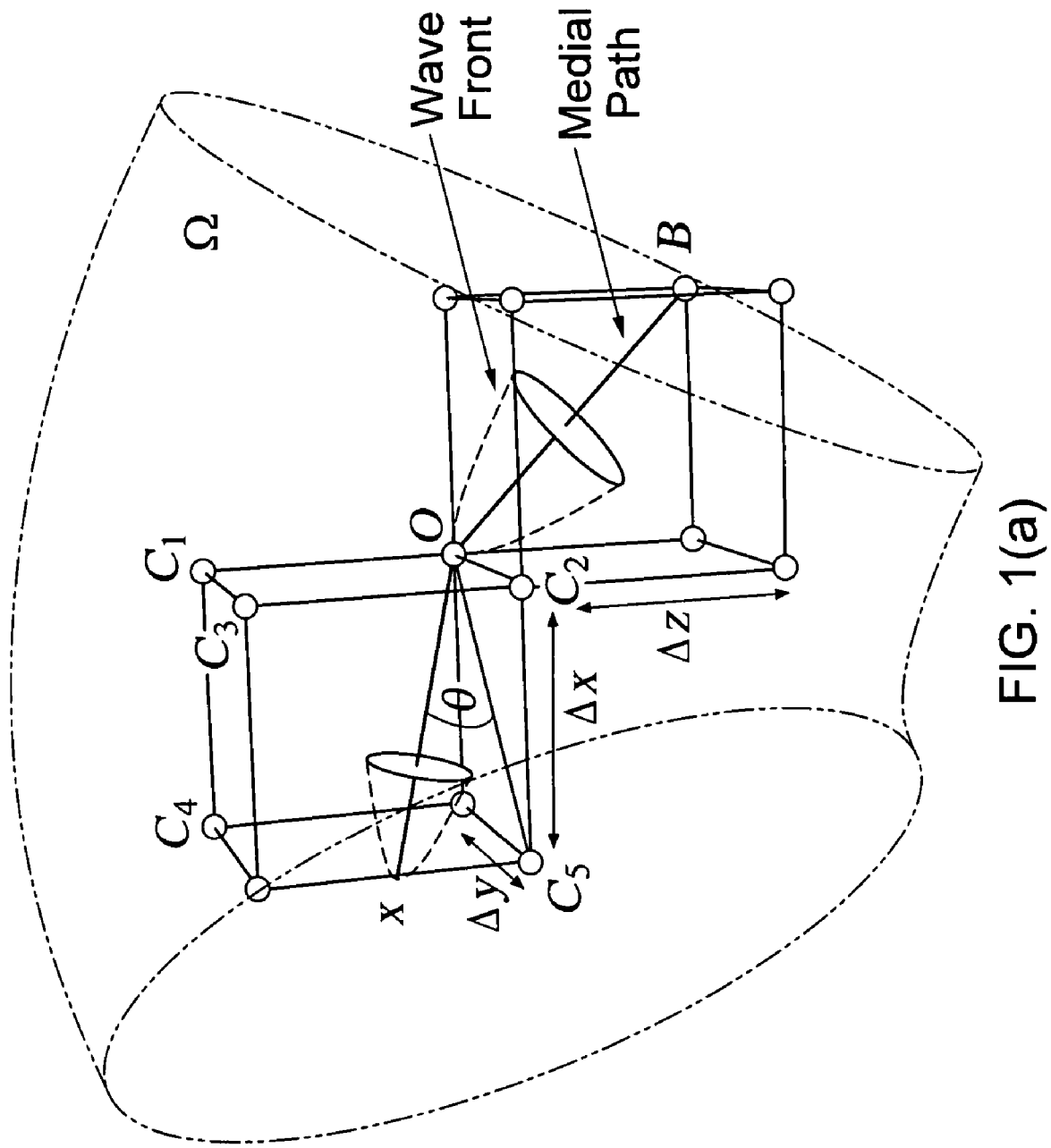
FIG. 1(a) shows, for a portion of an object $\Omega$, a curve skeleton and the propagation of a wave front to develop the skeleton through the invention where lattice voxels are labeled $C_N$.

The invention provides a sub-voxel accurate and robust variational framework for computing continuous curve skeletons from discrete objects that are represented by closed manifolds. In methods and software of the invention, code propagates inside the object, monotonic waves of different speeds to initially extract the topology of the shape and then compute the desired curve skeletons.

Embodiments of the invention utilize a variational framework for computing curve skeletons (CS). Embodiments utilize an energy function, which is proportional to some medialness function, such that the minimum cost path between any two medial voxels in the shape is a curve skeleton. Different medialness functions include the Euclidean distance field and a modified version of the magnitude of the gradient vector flow (GVF), which results in two different energy functions. The first energy function controls the identification of the topological nodes of the shape from which curve skeletons start, while the second one controls the extraction of the curve skeletons. Preferred embodiments are completely automated since all its parameters are analytically derived. Embodiments are highly less sensitive to boundary noise, are able to extract the entire curve skeletons, as well as only part of it given the starting and the end voxels, and do not require voxels to be isotropic. In addition, computed curve skeletons are highly centered and form a connected graph. Also, methods of the invention do not need to conduct steps to identify and classify medial junction nodes to compute and connect curve skeletons, unlike some typical prior methods. Preferred embodiments have been validated the framework both quantitatively and qualitatively against several 3D shapes of different complexity.

A preferred embodiment framework (software) works as follows: an object medial voxel is selected automatically and is considered a point source (PS) that transmits a monotonically advancing front, whose motion is governed by the Eikonal equation. Initially, a PS transmits a wave front ($\beta$-front), whose speed is inversely proportional to the first energy function, to explore the object domain and to extract its salient topological information. Then, it transmits another wave ($\alpha$-front), whose speed is inversely proportional to the second energy function, such that curve skeletons intersect the propagating fronts at the voxels with maximum positive curvatures. Curve skeletons are then computed by tracking them, starting from each computed salient topological node until a PS is reached, or intersect a previously computed curve skeleton, by solving an ordinary differential equation, using an efficient numerical scheme.

The method and software of the invention has a number of advantages. Advantages include the ability to extract continuous curve skeletons from discrete objects in very reasonable time, is a level set-based extraction technique with derived speed functions, that is completely automated because all its parameters are analytically derived, has high immunity to boundary noise, does not require junction nodes to be identified and classified, and does not require voxels to be isotropic. The accuracy and robustness of the present method have been validated both quantitatively and qualitatively against competing techniques as well as several 3D shapes of different complexity.

Embodiments of the invention generalize not fully automated variations of the of the Farag et al. CVPR technique (see Background). In this embodiment, computed centerlines are used as flight paths for a virtual camera to render the internal views of hollow organs in virtual endoscopy applications. The accuracy of the generated centerlines is validated against phantoms with ground truth centerlines. This is a powerful technique, but uses a speed model that does not guarantee convergence and speed parameters are set heuristically and hence prevent the framework from automation. Preferred generalized and fully automated embodiments of the invention include modifications of the above example embodiments and the prior Farag et al. work discussed in the background. Preferred embodiments of the invention provide a sub-voxel accurate, robust framework for computing continuous curve skeletons of an object that is represented by a closed manifold, using a variational method. In preferred embodiments a variational approach extracts continuous curve skeletons from discrete objects represented in 2D and 3D data. An analytical speed function in the level set setup performs skeletonization. Parameters are estimated automatically from the object being represented. There is no constraint that voxels be isotropic because grid spacing are taken into account while solving the underlying partial differential equation (PDE) or ordinary differential equation (ODE). Embodiments of the invention are robust to noise and can be used to extract the curve skeleton of a part of the object given its two end points.

A modified embodiment alters the computation of the gradient vector flow (GVF), whose complexity is O(kN), where N is the number of voxels of the shape, and k is the number of iterations. To reduce computational burden, the GVF can be implemented in the graphical processing unit of a commodity graphics card or by utilizing the Intel SSE instructions. For 300×300×300 volume, it takes around 30 seconds with 500 iterations, on a Pentium 4 with 2 GB memory. For tubular structures, the computation of the GVF can be replaced by distance field, and hence the performance of the framework is fast Particular preferred embodiments will now be discussed. The operations of preferred embodiment software follow the steps and calculations discussed below. Artisans will recognize that different coding strategies, platforms, and languages can be used to implement embodiments of the invention. An input to software of the invention is image data, which can be obtained from many sources and in many formats. Software of the invention can output for storage or display curve skeleton data of an object represented in the image data.

Consider the variational minimum-cost path problem that finds the path $\gamma(s):[0,\infty) \to R^n$ that minimizes the cumulative travel cost from a starting point A to some destination B in $R^n$. If the cost u is only a function of the location x in the given domain, then the cost function is called isotropic, and the minimum cumulative cost at x is defined as $$T(x) = \min_{\gamma_{Ax}} \int_A^x u(\gamma(s))ds \qquad (1)$$

where $\gamma_{Ax}$ is the set of all paths linking A to x. The path length is L and the starting and ending points are $\gamma(0)=A$ and $\gamma(L)=x$, respectively. T(x) is the minimum cost required to travel from A to x. The path that gives minimum integral is the minimum cost path. In geometrical optics, it has been proven that the solution of Eq. (1) satisfies the Eikonal equation as follows:

$$|\nabla T(x)|F(x)=1 \qquad (2)$$

In Eq. (2), T(x) can be interpreted as the minimum arrival time of a wave as it crosses a point x and the speed function F(x) is given by the reciprocal of the cost function, $$F(x) = \frac{1}{u(x)} \qquad (3)$$

In the present invention, a new energy cost function u(x) (i.e., reciprocal of F(x)) is derived such that the minimum cost path between two medial voxels in the object is a curve skeleton as stated in the following theorem.

A. Curve Skeleton Extraction (CSE) Theorem

Theorem 1: Let x and $B \in \Omega \subset R^3$ be two medial points with respect to some domain $\Omega$. Let B be a point source that transmits a monotonically advancing front in its normal direction until x is reached. If the speed of the front is given by, $F(x)=\exp(\alpha\lambda(x))$ where $\alpha$ is a positive real number and $\lambda(x):\Omega \to R_+$ is medialness function defined over $\Omega$. Then, the minimum cost path between x and B is a subset of the curve skeletons of $\Omega$ given that, $$\alpha > \frac{1}{\delta}\ln\left(\frac{\sqrt{\Delta^2 x + \Delta^2 y + \Delta^2 z}}{\min(\Delta x, \Delta y, \Delta z)}\right) \delta \neq 0$$

where $\Delta x$, $\Delta y$, and $\Delta z$, are the grid spacing and $\delta$ is the minimum absolute difference in medialness of two neighbor voxels.

Proof 1: Consider a curve skeleton of 1(a) that passes through the medial points B, O, and x. Let $C_i$ be a non-medial point, where $C_i \in \eta_o$ and $\eta_o$ is the 26 neighbor points of O. Assume that B is a point source $P_s$ that transmits a monotonically advancing front in its normal direction at t=0. Assume that the front reaches O, x, and $C_i$ at times $t_0$, $t_0+\Delta t_x$, and $t_0+\Delta t_{Ci}$, respectively. The goal is to find an energy cost function such that the front reaches x before reaching $C_i$ even if $\epsilon(O,x) > \epsilon(O,C_i)$, where $\epsilon(.,.)$ is the Euclidean distance. If such function is defined, then the front will be faster at medial points rather than non medial ones, and hence the desired curve skeleton intersects the propagating front at those points of maximum positive curvatures. Otherwise, the front that reaches $C_i$ will have a large positive curvature, and hence $C_i$ is a medial point, which contradicts its definition. To achieve the goal, the following condition must be satisfied.

$$\Delta t_x = \frac{\epsilon(O,x)}{F(x)} < \Delta t c_i = \frac{\epsilon(O,C_i)}{F(C_i)} \qquad (4)$$

which is equivalent to satisfy $$\frac{\epsilon(O,x)}{\epsilon(O,C_i)} < \frac{F(x)}{F(C_i)} \qquad (5)$$

Let the function $F(x):\Omega \to R_+$ be given by $$F(x)=g(\lambda(x)) \qquad (6)$$

where $\lambda(x):\Omega \to R_+$ is a medialness function that assigns medial points higher weights than non medial ones; $\lambda(x) > \lambda(C_i)$. Let $$\lambda(x)=h, \lambda(C_i)=h-\delta_i \qquad (7)$$

where h and $\delta_i$ are positive real numbers and $\delta_i$ represents the absolute difference in medialness between two neighbor points. Since the ratio $\epsilon(O;x)/\epsilon(O,C_i)$ is maximum when $$\epsilon(O,x)=\sqrt{\Delta^2 x + \Delta^2 y + \Delta^2 z}, \epsilon(O,C_i)=\min(\Delta x, \Delta y, \Delta z) \qquad (8)$$

Then, in order to satisfy Eq. (5), the speed function F will be designed such that $$\frac{F(x)}{F(C_i)} > \frac{\sqrt{\Delta^2 x + \Delta^2 y + \Delta^2 z}}{\min(\Delta x, \Delta y, \Delta z)} < \frac{g(h)}{g(h-\delta_i)} \quad (9)$$

Indeed, this latter inequality implies that $$r = \frac{\sqrt{\Delta^2 x + \Delta^2 y + \Delta^2 z}}{\min(\Delta x, \Delta y, \Delta z)} < \frac{g(h)}{g(h-\delta_i)} \quad (10)$$

then $$rg(h-\delta_i) - g(h) < 0 \quad (11)$$

Applying Taylor series expansion to $g(h-\delta_i)$ and substituting into Eq. (11), we get $$r\left(g(h) - \delta_i \frac{dg(h)}{dh} + \varepsilon(\delta_i)\right) - g(h) < 0 \quad (12)$$

where $$\varepsilon(\delta_i) = \sum_{k=2}^{\infty} (-1)^k \frac{\delta_i^k d^k g}{k! dh^k} \quad (13)$$

Assume for now that $\varepsilon(\delta_i) \to 0$ s very small such that it can be ignored without affecting the inequality. Later, the condition that satisfies this assumption will be derived. By rearranging Eq. (12), where higher order terms are being ignored, $$\frac{dg(h)}{g(h)} > \frac{r-1}{r\delta_i} dh \quad (14)$$

Since $\delta_i$ varies from one point to another. Then, without loss of generality fix $\delta_i$ over $\Omega$ to its lowest value such that the inequality of Eq. (14) is satisfied.

$$\delta_i = \delta = \min_{x \in \Omega, y \in \eta_x} \{|\lambda(x) - \lambda(y)|, \lambda(x) \neq \lambda(y)\} \quad (15)$$

Let $$\alpha_1 = \frac{r-1}{r\delta} = \frac{1}{\delta}\left(1 - \frac{\min(\Delta x, \Delta y, \Delta z)}{\sqrt{\Delta^2 x + \Delta^2 y + \Delta^2 z}}\right) > 0 \quad (16)$$

By integrating both sides of Eq. (14) for a given x, we get $$\int_{\lambda_{min}}^{\lambda(x)} \frac{dg(h)}{g(h)} > \int_{\lambda_{min}}^{\lambda(x)} \alpha_1 dh \quad (17)$$

$$\ln g(\lambda(x)) - \ln g(\lambda_{min}) > \alpha_1(\lambda(x) - \lambda_{min}) \quad (18)$$

$$\ln F(x) > \alpha_1 \lambda(x) - (\alpha_1 \lambda_{min} - \ln F_{min}) \quad (19)$$

where $\lambda_{min}$ is the minimum medialness and $F_{min} = g(\lambda_{min})$ is the minimum speed value. Let $$\zeta = \alpha_1 \lambda_{min} - \ln F_{min} \quad (20)$$

then, $$F(x) > \exp(\alpha_1 \lambda)(x) - \zeta) = \exp(-\zeta)\exp(\alpha_1 \lambda(x)) \quad (21)$$

There are infinite number of speed functions that satisfy Eq. (21), among which the one that allows neglecting $\varepsilon(\delta)$ without altering the inequality is chosen. For some $\alpha_2 > 0$, one possible choice for F(x) is $$F(x) = \exp(\alpha_2 \lambda(x))\exp(\alpha_1 \lambda(x)) \quad (22)$$

which requires, $$\exp(\alpha_2 \lambda(x)) > \exp(-\zeta) \quad (23)$$

$$\alpha_2 \lambda(x) > \ln F_{min} - \alpha_1 \lambda_{min} \quad (24)$$

By restricting the minimum value of the speed to be unity, the equations always hold. Therefore, Eq. (22) reduces to $$F(x) = \exp(\alpha \lambda(x)), \alpha = \alpha_1 + \alpha_2 \quad (25)$$

Any front that moves with such a speed will is called $\alpha$-front. Now, let's find the condition that satisfies $\varepsilon(\delta) \to 0$. By substituting the inventive speed function Eq. (25) into Eq. (12), we get $$r\left(\exp(\alpha h) - \delta \alpha \exp(\alpha h) + \frac{\delta^2 \alpha^2}{2!}\exp(\alpha h) - \ldots\right) - \exp(\alpha h) < 0 \quad (26)$$

$$\exp(\alpha h)(r\exp(-\delta \alpha) - 1) < 0 \quad (27)$$

Therefore, $$\alpha > \frac{1}{\delta}\ln(r) = \frac{1}{\delta}\ln\left(\frac{\sqrt{\Delta^2 x + \Delta^2 y + \Delta^2 z}}{\min(\Delta x, \Delta y, \Delta z)}\right) \quad (28)$$

which is the necessary condition to satisfy Eq. (14).

Under the inventive speed model Eq. (25), medial points are moving faster than non-medial ones. Also, since the energy cost function u(x) is the reciprocal of the speed, then medial points are assigned the minimum travel cost. As a consequence, the curve skeleton between x and B is the minimal cost path.

B. Single Curve Skeleton Extraction

For isotropic fast marching, the fastest traveling is always along the direction perpendicular to the wave front (isocurves of the arrival time T(x)). Since the propagating fronts are level sets, then the direction of the gradient at each medial voxel is normal to the front. Therefore, by backtracking along the negative gradient of T(x) a distance h starting from a medial voxel $P_n$, the next voxel $P_{n+1}$ is guaranteed to be medial because it is located along the direction of fastest traveling. This recursive process can be described by the following ordinary differential equation (ODE).

$$\frac{dP(s)}{ds} = -\frac{\nabla T}{|\nabla T|}, P(0) = P_0 \quad (29)$$

Where, P(s) traces out the curve skeleton. If A and B are the starting and ending voxels of the curve skeleton, then tracking continues from P(0)=B until A is found as shown in 1(*b*). A is guaranteed to be found because the field is monotonically increasing from A to B. In Eq. (29), the normalized gradient is used. Therefore, h is set according to the following inequality, $$0 < h < \min(\Delta x, \Delta y, \Delta z) \qquad (30)$$

For isotropic grid spacing, h is set to 0.5.

The ODE given by Eq. (29) can be solved using different integration methods such as Euler method, Heun's method, and $n^{th}$ order Runge-Kutta methods. Although the fourth-order Runge-Kutta is more accurate than other methods, the gain in accuracy is sometimes lost by interpolation at non-lattice voxels. Therefore, the second order Runge-Kutta method is a preferred solution because it strikes a balance between high accuracy and speed of computation. The second order Runge-Kutta is given by, $$P_{n+1} = P_n + hk_2 \qquad (31)$$

where $$f(P_n) = -\frac{\nabla T(P_n)}{|\nabla T(P_n)|}, k_1 = f(P_n), k_2 = f\left(P_n + \frac{h}{2}k_1\right)$$

The total accumulated error is on the order of $O(h^3)$. The gradient is evaluated at non-lattice voxels using trilinear interpolation.

C. Medialness Function λ(x)

The medialness function $\lambda(x): \Omega \subset R^3 \to R_+$, is a scalar function that distinguishes medial voxels by assigning them higher weights than non medial ones. It also must be monotonically increasing from the boundary of the object towards its center. Different medialness functions can be used. Each of which is suitable for a specific category of objects or applications.

Distance Transform Medialness:

$$\lambda_1(x) = D(x) \qquad (32)$$

This medialness assigns each object voxel x its minimum distance from the boundary.

$$D(x) = \min_{x \in \Omega, y \in \Gamma} \{\varepsilon(x, y)\} \qquad (33)$$

In Eq. (15), δ is defined as the minimum absolute difference in medialness of two neighbor voxels. Then, $$\delta = \min(\Delta x, \Delta y, \Delta z) \qquad (34)$$

This medialness is suitable for extracting centerlines of arbitrary 2D shapes as well as curve skeleton of 3D tubular objects, whose cross section is nearly or perfectly circular. See, [cite 39]

Gradient Vector Flow Medialness: The gradient vector flow (GVF) is a bi-directional external force field that moves active contours in highly concave regions. The GVF is the vector field $V(x) = [u(x) \ v(x) \ w(x)]^T$, which minimizes the following energy function, $$E(V) = \iiint \mu |\nabla V(x)|^2 + |\nabla f(x)|^2 |V(x) - \nabla f(x)|^2 dx \qquad (35)$$

Where x=(x, y, z), μ is a regularization parameter, f(x) is an edge map derived from the imaging volume I(x), and the gradient operator ∇ is applied to each component of V separately. For a binary volume, f(x)=−I(x). The interpretation of Eq. (35) is that if |∇f(x)| is small, E(V) is dominated by the sum of squares of the partial derivatives of the vector field, yielding a slowly varying field. On the other hand, if |∇f(x)| is large, E (V) is dominated by the second term, and is minimized by setting V=∇f (x). This produces a vector field V(x) that is nearly equal to the gradient of the edge map ∇f (x) when it is large and slowly varying in homogeneous regions. V(x) can be computed iteratively by solving the following decoupled partial differential equations in u, v, and w.

$$u(x,t+1) = u(x,t) + \Delta t(\mu \nabla^2 u(x,t) - (u(x) - f_x(x))|\nabla f(x)|^2)$$

$$v(x,t+1) = v(x,t) + \Delta t(\mu \nabla^2 v(x,t)(v(x) - f_y(x))|\nabla f(x)|^2)$$

$$w(x,t+1) = w(x,t) + \Delta t(\mu \nabla^2 w(x,t) - (w(x) - f_z(x))|\nabla f(x)|^2)$$

$$V(x,0) = \nabla f(x) \qquad (36)$$

The iterative process is guaranteed to converge if $$\Delta t \leq \frac{\Delta x \Delta y \Delta z}{6\mu} \qquad (37)$$

One of the interesting properties of the magnitude of the GVF (i.e., |V(x)|) over the distance transform D(x) is that, it does not form medial surfaces for non-tubular 3D objects. Our interpretation to this nice property is that only one boundary voxel contributes to the computation of D(x), while more than one boundary voxels contribute to the computation of V(x) during the diffusion process. Since V(x) is moving very slowly from the boundary of the object, where its magnitude is high towards the center of the object, where its magnitude is small, |V(x)| is not strong enough to distinguish between medial and non-medial voxels as shown in 4(a).

To achieve the desired distinction, the following medialness function is provided by the invention, $$\lambda_2(x) = \max(|V|^q) - |V(x)|^q < 1 \qquad (38)$$

The parameter q is the called the field strength that reshape |V(x)| to achieve the desired medialness. This medialness is suitable for extracting curve skeletons of general 3D objects.

The original GVF have been slightly modified to suit the skeletonization problem as follows: (1)f(x)=I (x) such that the vector field points towards the center of the object. (2) The computation of the GVF is restricted to the internal voxels of the object, and hence computationally more efficient than the original GVF. The GVF field is not normalized to maintain the medialness property; otherwise the magnitude of the GVF is unity everywhere.

Figure 2A:
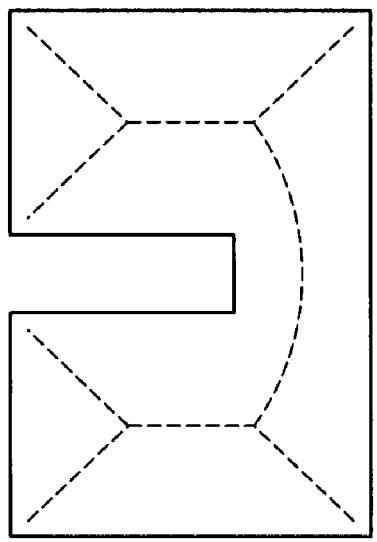
FIGS. 2(a) and 2(d) illustrate the development of the proposed medialness in this invention for a non-convex U-shaped object, which is known to be a difficult shape for some other medialness such as the Newtonial function as shown in FIG. 2(c), where it suffers from a visibility problem resulting in a non-centered path.
Figure 2B:
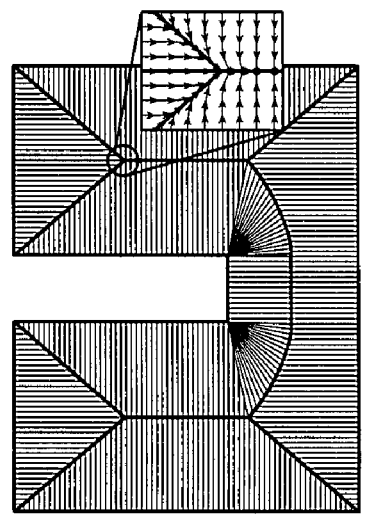
Figure 2C:
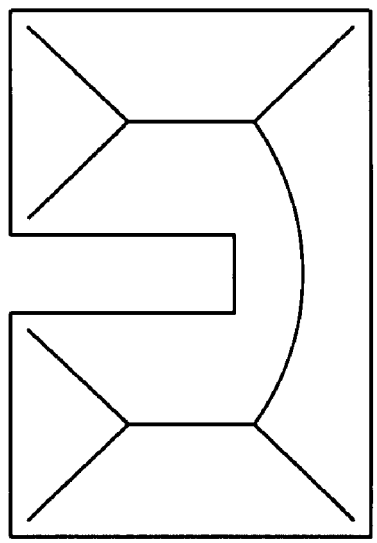
Figure 2D:
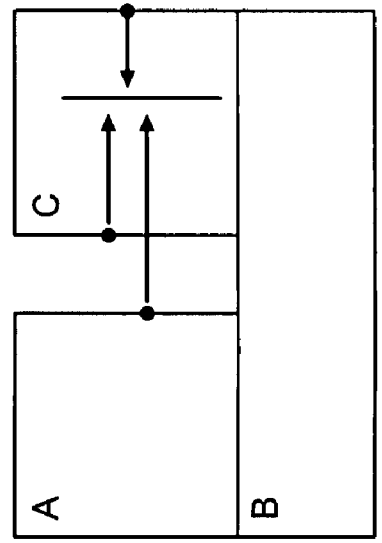

It has been mentioned earlier that potential field methods suffer from visibility errors while computing the potential function for non-convex objects, which may result in loss of centeredness of the computed skeletons of the type shown in FIGS. 2(a)-2(d). FIGS. 2(a)-2(b) illustrate a non-convex U-shape. FIG. 2(a) shows the original magnitude of GVF; |V(x)|. FIG. 2(b) shows the present medialness $\lambda_2(x)$. As seen in FIG. 2(c), points on the right boundary of segment A induce an outward shift of the skeletal line in segment C (and vice versa) using the technique. J.-H. Chuang, C.-H. Tsai, and M.-C. Ko, "Skeletonization of three-dimensional object using generalized potential field," IEEE Trans. Pattern Anal. Mach. Intell., vol. 22, no. 11, pp. 1241-1251, 2000; N. Cornea, D. Silver, X. Yuan, and R. Balasubramanian, "Computing hierarchical curve-skeletons of 3d objects.", Visual Computer, 2005. FIG. 2(d) shows the GVF vector field diffuses equally from boundary points. FIG. 2(a) shows that the inventive GVF based medialness function does not suffer from this problem due to the nature of the diffusion process that governs the generation of the GVF.

Unlike $\lambda_1(x)$, there is no closed form expression for $\delta$ and hence, it must be computed for each object as given by Eq. (15). The value of q will be determined empirically by minimizing the average error norm $L_1$ between the ground truth and computed curve skeletons of a 3D rectangular slab, which is known to have medial surfaces as its skeleton rather than a set of curve skeletons. See, FIGS. 3(a) and 3(b).

Figure 3B:
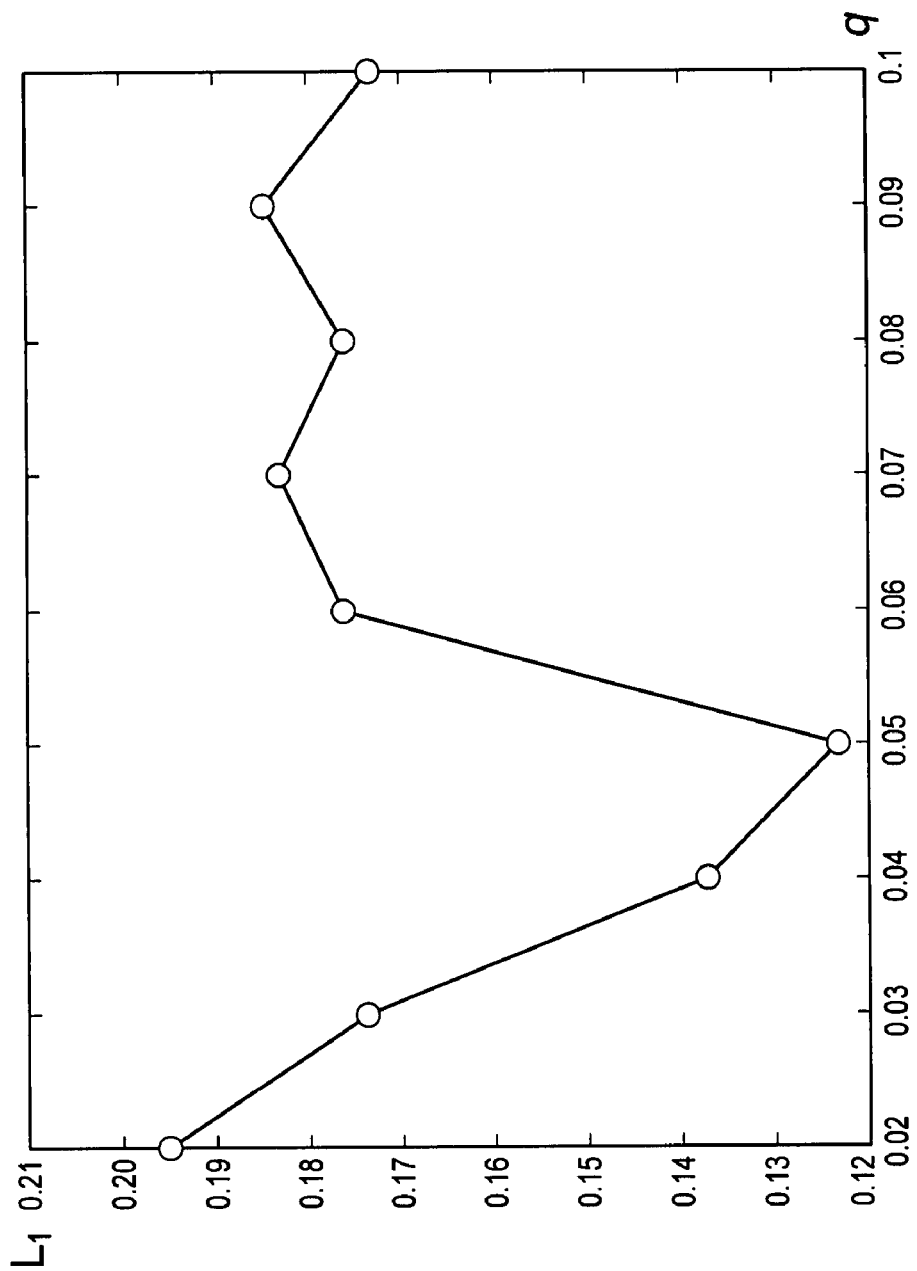
FIGS. 3(a) and 3(b) respectively illustrate a 3D rectangular slab with ground truth curve skeletons and the average L1 error norm of multiple slabs at different scales versus q.
Figure 3A:
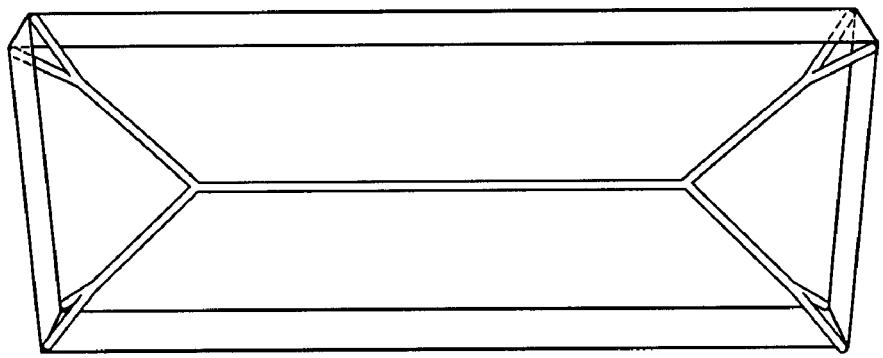

In order to compute the curve skeletons of that synthetic shape, we need to compute $\alpha$, which is a function of $\delta$, and the later, is a function of q, which is to be estimated (a contradiction to automatic calculation). The invention resolves this problem. Since increasing $\alpha$ favors medial points over non-medial ones. Then, increasing $\alpha$ will increase the path centeredness. Therefore, instead of computing $\delta$, the parameter $\alpha$ is set to a reasonable large value. Then, manually change the value of q in steps. In each step, the $L_1$ error norm is computed and then the experiment is repeated several times for several scaled versions of the same synthetic object. Finally, the value of q that gives the minimum error is chosen, which is found to be 0.05 as shown in FIG. 3(b).

D. Computation of Point Source

The point source $P_s$ must belong to any curve skeleton of the object. For arbitrary 2D shapes or 3D tubular structures, $P_s$ is selected as the voxel with global maximum in $\lambda_1(x)$. If there exist more than one voxel with the same global maximum, any of which can be selected.

$$P_s = \arg\max_x \lambda_1(x) \quad (40)$$

For general shapes, $P_s$ is selected as the voxel with global maximum in $\lambda_2(x)$. If there exist more than one voxel, the one with maximum $\lambda_1(x)$ is selected.

$$P_s = \arg\max_x \lambda_2(x) \quad (41)$$

E. Multiple Curve Skeleton Extraction

In order to extract the entire CS of an object, we have to first identify its important topological nodes from which its CS originate and then apply the inventive single curve skeleton extraction procedure, which starts from each topological node until $P_s$ is reached or intersects a previously extracted CS to prevent overlapped paths. Hence, we do not have to worry about the characterization of the different types of junctions that forms the medial axis.

1) Level Set Graph (LSG): If the object could be represented by a graph, then its important topological nodes could be identified easily. The present application proposes an automatic method for identifying the salient topological nodes of an object by converting it into a graph, called Level Set Graph (LSG). Initially, the distance field $D(x)$ is computed. Then, a $\beta$-front is propagated from $P_s$. The motion of the front is governed by the Eikonal equation, whose solution is a new distance field $D_1(x)$. The speed of the front is given by, $$F(x) = \exp(\beta D(x)), \beta > 0 \quad (42)$$

The parameter $\beta$ is a speeding parameter to be derived later. Let $\hat{D}_1(x)$ be the discretized version of the floating distance field $D_1(x)$ $$\hat{D}D_1(x) = \text{round}(D_1(x)) \quad (43)$$

$\hat{D}_1$ converts the object with voxels as its basic elements into an object with clusters as its new basic elements. Each cluster consists of connected voxels with the same $\hat{D}_1$ value (level set function). Therefore, more than one cluster with the same $\hat{D}_1$ may exist, if they are not adjacent. Two voxels are said to be connected if they shares a face, an edge, or a vertex (26-connected). Two clusters $c_1$ and $c_2$ are adjacent if a voxel in $c_1$ share a face with a voxel in $c_2$ (6-connected).

Figure 4C:
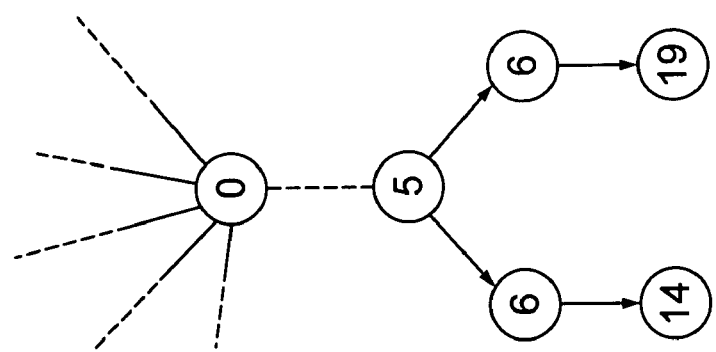
FIGS. 4(a)-4(c) illustrate the development of a level set graph for a tree shaped object.
Figure 4B:
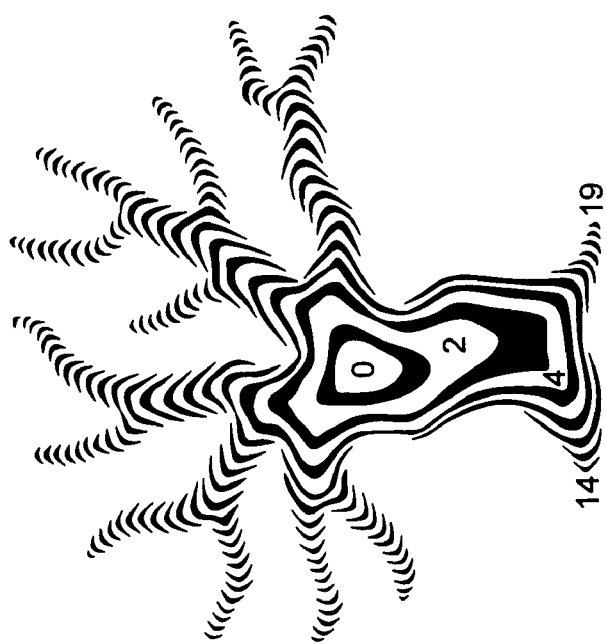
Figure 4A:
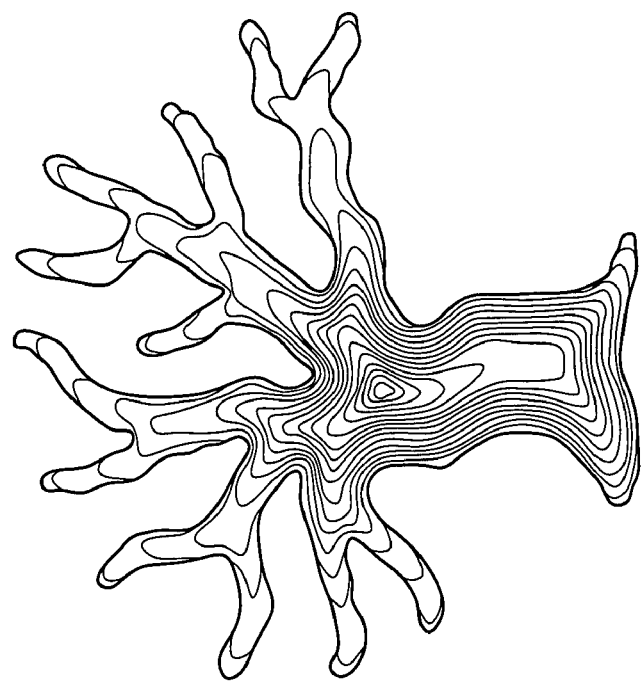

FIGS. 4(a)-4(c) illustrate the steps in constructing the LSG. FIG. 4(a) shows construction of a new distance field $D_1(x)$ due to a $\beta$-front propagation. FIG. 4(b) shows discretization of $D_1(x)$ results in the LSG, which is represented here by a set of adjacent clusters. FIG. 4(c) shows that LSG is represented by both links and nodes. In the LSG, each cluster is represented by a node and adjacent clusters by links. The root of the graph is the cluster containing $P_s$ with zero cluster value, followed by clusters with increasing $\hat{D}_1$ value. The LSG contains three types of clusters: extreme clusters (Xcluster), which exist at the tail of the graph, branching clusters (Bcluster), which has at least two adjacent clusters with the same $\hat{D}_1$, value but greater than the $\hat{D}_1$ value of Bcluster, and merging cluster (Mcluster), which have at least two adjacent clusters (Successors) with the same $\hat{D}_1$ value but lower than the $\hat{D}_1$ value of Mcluster. Merging clusters exist only if the object contains holes (loops).

Figure 5B:
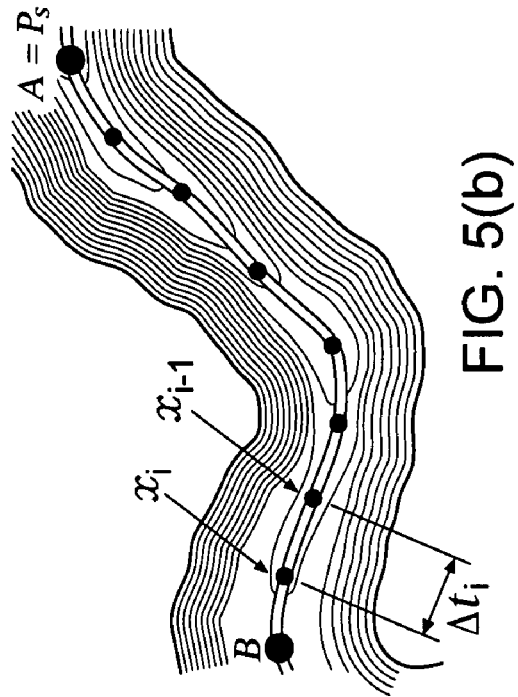
FIG. 5(b) illustrates that the curve skeleton of an arbitrary shape consists of N medial voxels.
Figure 5C:
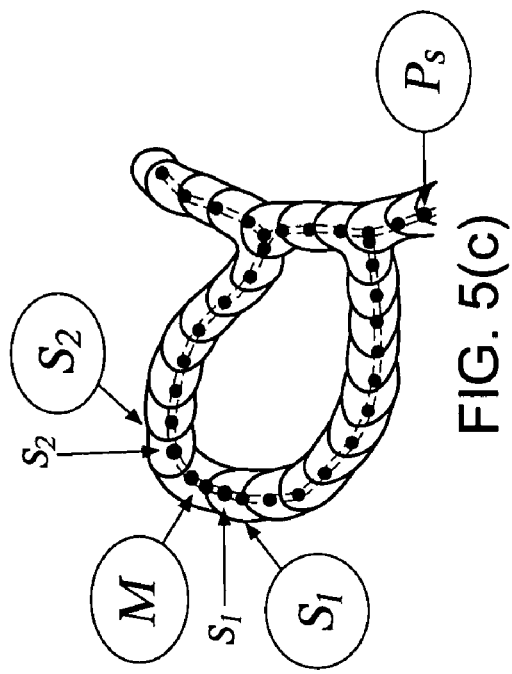
FIG. 5(c) illustrates the curve skeletons around a loop of the object.
Figure 5A:
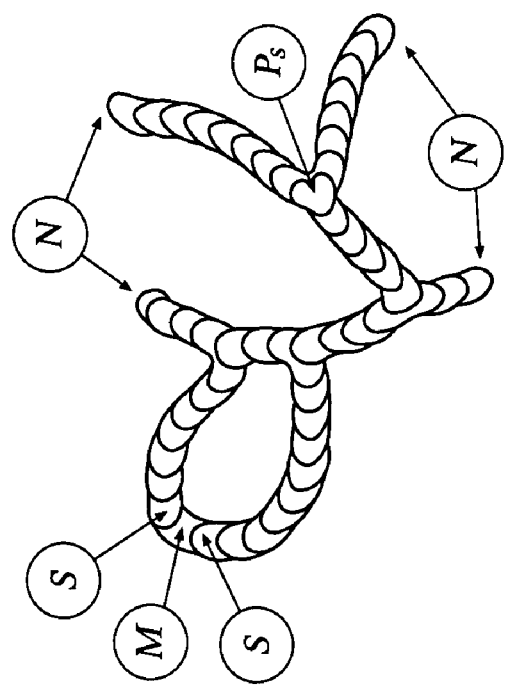
FIG. 5(a) illustrates different types of clusters of the level set graph for a tubular object.

The medial voxel of a cluster is computed by searching the cluster for the voxel with maximum $\lambda_1(x)$ for tubular structure, or the voxel with maximum $\lambda_2(x)$ for general shapes. Extreme and merging nodes are the medial voxels of the associated clusters. FIGS. 5(a)-5(c) show the LSG of a tree structure with one loop, where X, M, and S represent extreme, merging, and successor clusters, respectively. FIG. 5(a) illustrates the different types of clusters of the LSG. FIG. 5(b) shows the curve skeleton of an arbitrary shape consists of N medial voxels. FIG. 5(c) shows curve skeletons around a loop.

2) Analytical Derivation of $\beta$: Consider the CS of a 3D shape, whose end points are A and B as shown in FIG. 5(b). The CS consists of N points and N−1 line segments. Let A be a point source P. that transmits a $\beta$-front. Let T be the total travel time from A to B along the CS as follows $$T = \sum_{i=1}^{N-1} \Delta t_i \quad (44)$$

where $\Delta t_i$ is the travel time between each two consecutive medial neighbor voxels, and is given $$\Delta t_i = \frac{\varepsilon(x_{i-1}, x_i)}{F(x_i)} \quad (45)$$

By restricting the value $\Delta t_i$ to be greater than a positive time $\tau$, then $$\tau \leq \frac{\varepsilon(x_{i-1} \cdot x_i)}{\exp(\beta \lambda(x_i))} \quad (46)$$

$$\beta \leq \frac{1}{\lambda(x_i)\ln\left(\frac{\varepsilon(x_{i-1}, x_i)}{\tau}\right)} \quad (47)$$

The worst case of the right hand side of Eq. (47) occurs when $\lambda(x_i)=\lambda_{max}$ and $$\epsilon(x_{i-1},x_i)=\min(\Delta x,\Delta y,\Delta z) \qquad (48)$$

Let $\beta_c$ be the critical value of $\beta$, then $$\beta_c = \frac{1}{\lambda_{max}}\ln\left(\frac{\min(\Delta x, \Delta y, \Delta z)}{\tau}\right), 0 < \tau < 1 \qquad (49)$$

For unity isotropic voxels, setting $\tau=1$ results in $\beta_c=0$, and hence unity speed propagation. In this case, the front is not faster at the middle of the shape and the LSG fails to capture the large curvature parts of the shape such as loops. if $\tau>1$, $\beta$ is not positive anymore. Finally, if $\tau=0$, the natural logarithm is not defined. Therefore, $0<\tau<1$.

3) Extraction of Curve Skeletons Around Loops: The inventive framework extracts one CS for each hole the object may have. Each loop in the object is associated with one merging cluster M of the LSG. For illustration, let M have only two successors $S_1$ and $S_2$ as shown in FIG. 5(c). In order to extract the CS of this loop, three steps are required. The first step computes the medial voxel $s_1$ of the cluster $S_1$ and removes the clusters M and $S_2$ from the LSG such that there is a unique CS from $s_1$ to $P_s$. An $\alpha$-front is propagated from $P_s$ until $s_1$ is reached, and then the CS between them is extracted. In the second step, the CS between s2 and $P_s$ is extracted in a similar way to the first step except that the clusters M and $S_1$ are removed from the LSG instead. In the third step, an $\alpha$-front is propagated from $s_1$ until $s_2$ is reached and then the CS between them is extracted. The same concept can be generalized for a merging cluster with any number of successors.

G. Complexity Analysis

During the extraction of CS, the multi-stencils fast marching method (MSFM). See, e.g., M. S. Hassouna and A. A. Farag, "Multi-stencils fast marching methods: A highly accurate solution to the eikonal equation on cartesian domains," IEEE Transaction on Pattern Analysis and Machine Intelligence, vol. 29, no. 9, pp. 1-12, September 2007, has been used to solve the Eikonal equation with sub-voxel accuracy, while computing several distance fields: $D(x)$, $D_1(x)$, and $D_2(x)$. The complexity of the MSFM in solving the Eikonal equation is $0(n)$ by implementing the narrow-band as untidy priority queue [49], where n is the number of object's voxels. The complexity of the inventive extraction framework is then $O(3n)$. For 3D general shapes, the complexity of the framework is augmented by the complexity of computing the GVF, which is $O(kn)$, where k is the number of iterations.

II. Validation and Sensitivity Analysis

The accuracy of the analytical parameter estimation of the inventive speed models ($\alpha$-front and $\beta$-front) has been considered, the accuracy of the computed CS has been validated, and the sensitivity of the extraction framework to boundary noise has been studied.

A. 3D Synthetic Shapes

Different 3D synthetic shapes with known ground truth CS have been constructed. The ground truth are generated analytically. Each synthetic shape is created by translating a sphere of a fixed or varying radius along its ground truth path. FIG. 11 shows different 3D synthetic shapes with different complexity.

B. Accuracy of the Analytical Estimation of a for Tubular Shapes

The parameter a controls the centeredness property of the computed CS. The critical value of $\alpha$ is given by, $$\alpha_c = \frac{1}{\delta}\ln\left(\frac{\sqrt{\Delta^2 x + \Delta^2 y + \Delta^2 z}}{\min(\Delta x, \Delta y, \Delta z)}\right) \qquad (50)$$

Bad estimation of $\alpha$ may lead to undesired properties of the computed skeletons. For example, $\alpha<<\alpha_c$, the computed paths are trajectories rather than centered CS. On the other hand, if $\alpha>>\alpha_c$. the front speed will be very high and hence the arrival time is nearly zero. Since, during extracting a CS, backtracking stops if a voxel with zero travel time is reached. Then, the extraction process may halt pre-maturely if those voxels are encountered, leading to disconnected CS. For tubular shapes (see FIGS. 6(a)-6(c)) with unity isotropic voxels and $\lambda_1(x)$ as medialness, $\alpha_c=0.549$.

Figure 6C:
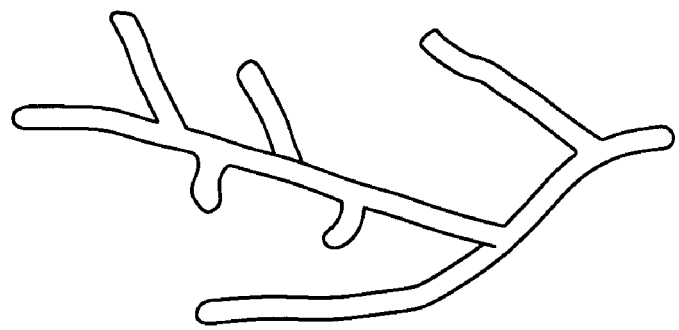
FIGS. 6(a)-6(c) illustrate synthetic 3D shapes of varying complexities.
Figure 6B:
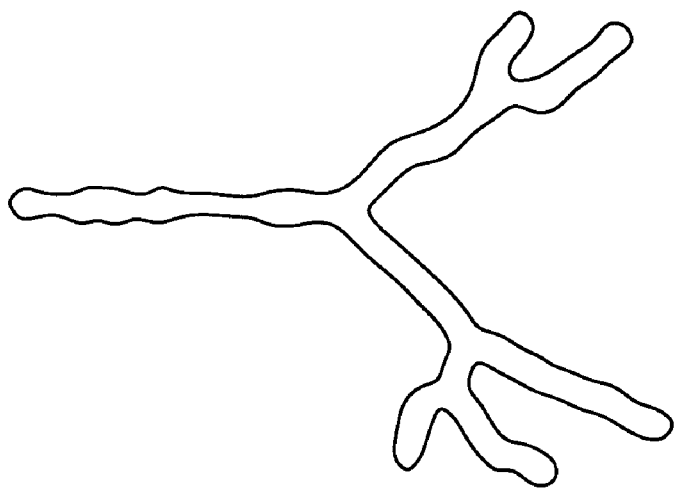
Figure 6A:
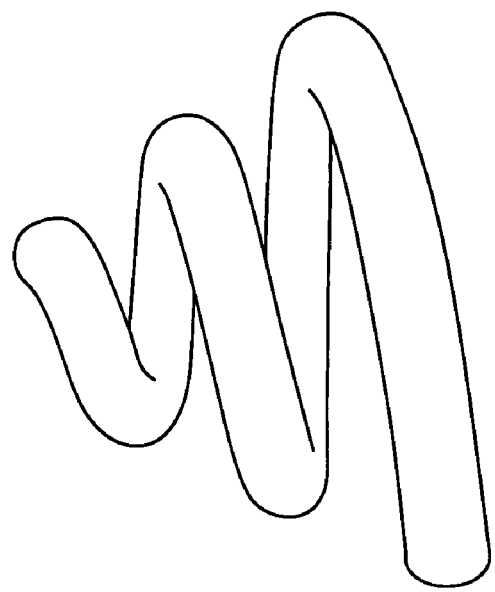
Figure 7A:
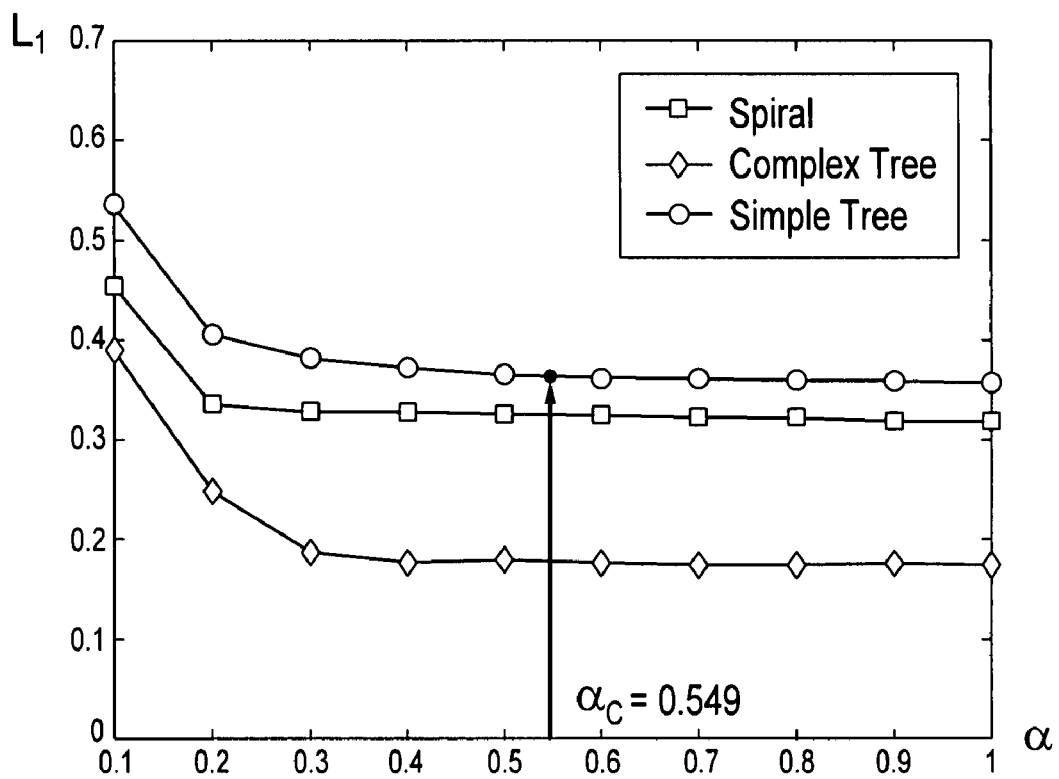
FIG. 7(a) shows computed $L_1$ error norms of different tubular synthetic shapes under different values of $\alpha$.

In this experiment, the accuracy of the analytical estimation of a for tubular structures is studied by changing the value of a from 0 to 1 in steps of 0.1. In each step, the L, error norm between the ground truth and computed curve skeletons is computed and then plotted versus $\alpha$as shown in FIG. 7(a). The range of $\alpha$; R$\alpha$ that corresponds to the minimum steady state error is determined. Finally, a check is made to see if the estimated $\alpha_c$ is within that range. FIG. 7(a) shows the computed L, error norms for different synthetic shapes: spiral FIG. 6(a), simple tree FIG. 6(b), and complex tree FIG. 6(c). It is clear from FIG. 7(a) that the estimated $\alpha_c$ is always within $R_\alpha$. Also, there is a wide stable range for $\alpha$ that is $\alpha_c<\alpha<1.0$.

C. Accuracy of The Analytical Estimation of a for General Shapes

Figure 7B:
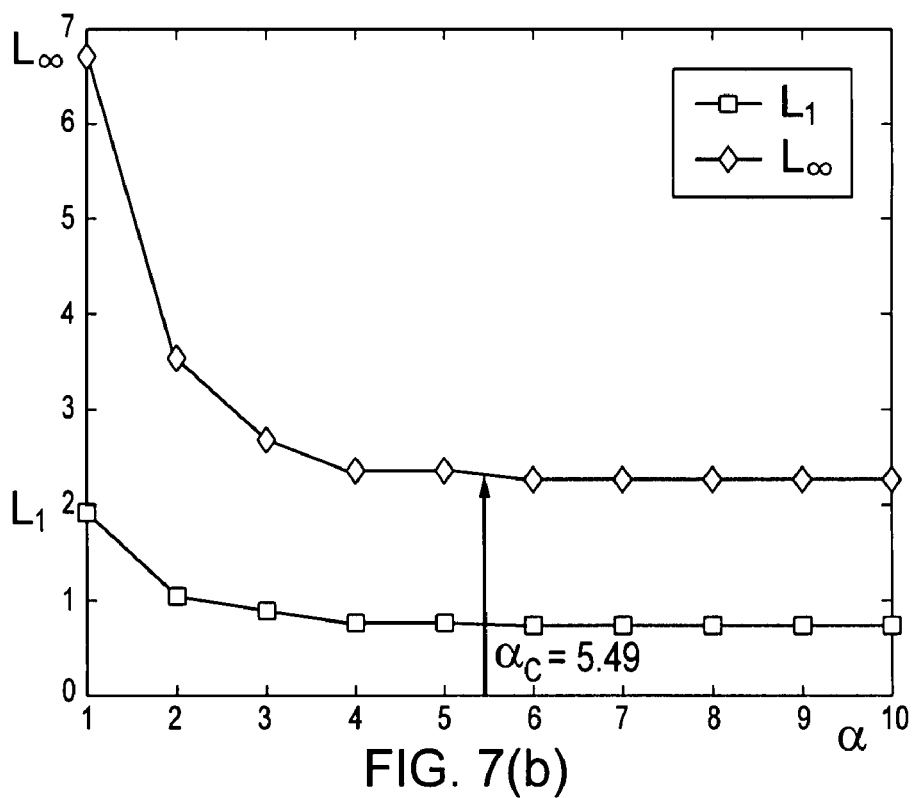
FIG. 7(b) shows computed $L_1$ and $L_\infty$ error norms of a rectangular slab under different values of $\alpha$.

In this experiment, the accuracy of the analytical estimation of $\alpha$ for general shapes is studied by changing the value of $\alpha$ from 1 to 10 in steps of 1.0. In each step, the $L_1$ and $L_\infty$ error norms between the ground truth and computed curve skeletons of the rectangular slab of FIG. 5 are computed and then plotted versus $\alpha$ as shown in FIG. 7(b). In this experiment, the parameter $\delta$ is computed according to Eq. (15) from the generated GVF field at q=0.05, and is found to be approximately 0.1. According to Eq. (28), $\alpha_c$=5.49. It is clear from FIG. 7(b) that the estimated $\alpha_c$ is within R$\alpha$. Also, there is a wide stable range for a that is $\alpha_c \leq \alpha \leq 10.0$.

D. Effect of Changing $\beta$ on The Generation of the LSG

This experiment studies the effect of changing the value of $\beta$ on the generation of the LSG. Again, we change the parameter $\tau$ from 0 to 1 in steps of 0.01. In each step, the $L_1$ error norm between the computed CS and the ground truth for the given synthetic shape is computed. The range of $\tau$ at which the error was minimum is recorded and is found to be $0.05 \leq \tau \leq 0.2$. FIGS. 8(a)-8(d) illustrate the LSG of a synthetic shape under different values of $\tau$. FIGS. 8(a) and 8(b) generate an adequate LSG that is capable of correctly describing the topology of the shape. For $\tau<0.05$ as shown in FIG. 8(c), the tails of extreme clusters span multiple neighbor clusters. Therefore, the location of the medial voxel of an extreme cluster may shift from its correct location. On the other hand, if $\tau>0.2$ as shown in FIG. 8(d), the LSG does not capture the large curvature parts of the shape, which will be the case if the shape contains both branches and loops.

E. Accuracy of Centeredness and Sensitivity to Boundary Noise

Figure 9C:
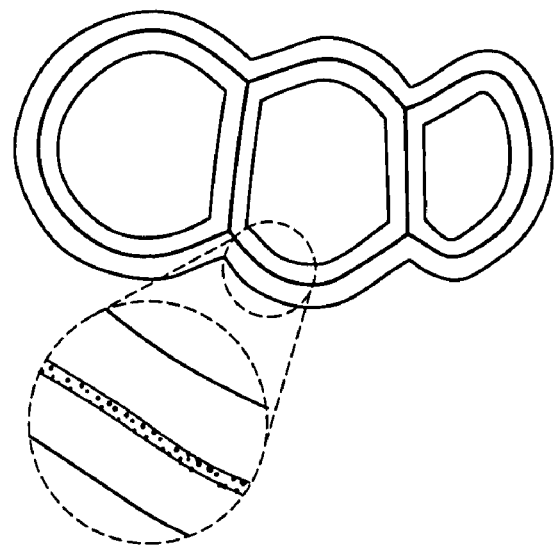
FIGS. 9(a)-9(c) illustrate insensitivity of methods of the invention to boundary noise for computed curve skeletons of different shapes having high noise profiles, respectively a rectangular slab, a spiral, and connected tubular rings.
Figure 9B:
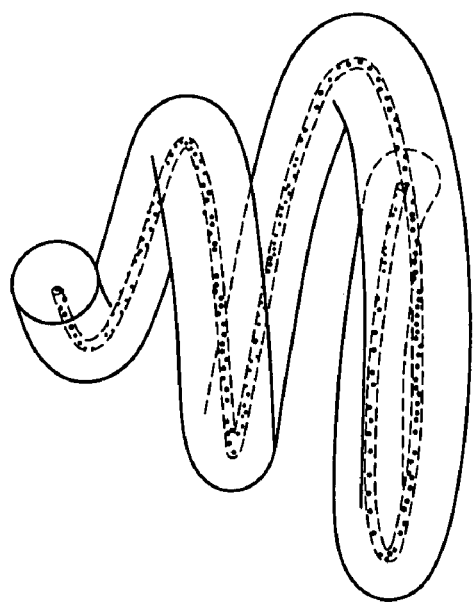
Figure 9A:
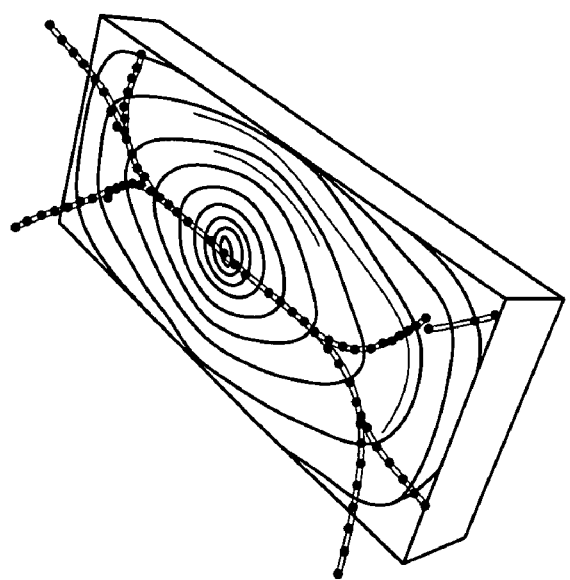

It is known that any perturbation of the object boundary creates an extra undesired curve skeleton. Therefore, for noisy objects, large numbers of curve skeletons are expected to be generated. The inventive framework overcomes this problem implicitly because the GVF is a smooth vector field even if the boundary is noisy as shown in FIGS. 9(a)-9(c), and explicitly by starting each curve skeleton from the medial voxel of each extreme cluster (e.g., away from the boundary voxels of that cluster). FIG. 9(a) shows care curve skeletons are superimposed on the iso-surfaces of the modified GVF for a rectangular slab with high noise profile; $N_1$=100%, FIG. 9(b) shows ground truth (light gray) and computed (dark gray) curve skeletons of a noisy spiral shape. FIG. 9(c) is similar to FIG. 9(b) but for a three connected donuts.

TABLE I $L_1$, $L_\infty$, AND σ ERROR MEASURES IN MM OF THE COMPUTED CS OF A SYNTHETIC SPIRAL OF SIZE 200 × 200 × 200.

| Error | $N_I$ | | | | | |
|---|---|---|---|---|---|---|
| | 0% | 20% | 40% | 60% | 80% | 100% |
| $L_1$ | 0.5 | 0.52 | 0.53 | 0.53 | 0.55 | 0.56 |
| $L_\infty$ | 1.66 | 1.76 | 1.76 | 1.76 | 1.76 | 1.78 |
| σ | 0.036 | 0.038 | 0.04 | 0.04 | 0.04 | 0.05 |

In this experiment, the sensitivity of the inventive framework against boundary noise is studied against 3 synthetic shapes with unity isotropic voxels; spiral, three connected donuts, and a rectangular slab. Let $N_1$ be the percentage of the boundary voxels BV that are affected by noise. The noise profile is generated as follows: for each boundary voxel $p \in BV \times N_1$, a fair coin is tossed, if the outcome is head, p is switched to the background, otherwise, one of the neighbor voxels of p is selected randomly and is then switched to the object foreground.

By setting $N_1$ to zero, the centeredness property of the computed CS can be studied as well. For each noise level, a quantitative analysis was carried out by computing the average error $L_1$ in mm, maximum error $L_\infty$ in mm, and standard deviation a between the ground truth and computed CS for both noise-free and noisy synthetic shapes. The quantitative results are presented in Table I, Table II, and Table III. For noise-free synthetic shapes, the $L_1$ and $L_\infty$ errors never exceeded 0.3 mm and 2.0 mm, respectively. In the presence of severe noise levels, the $L_1$ and $L_\infty$ errors never exceeded 1.13 mm and 2.12 mm (e.g., 1-2 voxels), respectively.

It is obvious from these experiments that the computed CS are highly insensitive to boundary noise. This fact is emphasized in FIGS. 9(a)-9(e) by superimposing the computed curve skeletons of a rectangular slab on the iso-surfaces of the modified GVF. Notice how the boundary of the object is highly noisy; $N_1$=100%, while the iso-surfaces is very smooth.

TABLE II $L_1$, $L_\infty$, AND σ ERROR MEASURES IN MM OF THE COMPUTED CS OF A THREE CONNECTED DONUTS OF SIZE 400 × 400 × 50.

| Error | $N_I$ | | | | | |
|---|---|---|---|---|---|---|
| | 0% | 20% | 40% | 60% | 80% | 100% |
| $L_1$ | 0.3 | 0.3 | 0.3 | 0.32 | 0.35 | 0.39 |
| $L_\infty$ | 1.34 | 1.12 | 1.78 | 1.82 | 1.9 | 2.1 |
| σ | 0.037 | 0.03 | 0.03 | 0.038 | 0.05 | 0.07 |

TABLE III $L_1$, $L_\infty$, AND σ ERROR MEASURES IN MM OF THE COMPUTED CS OF A RECTANGULAR SLAB OF SIZE 200 × 100 × 41.

| Error | $N_I$ | | | | | |
|---|---|---|---|---|---|---|
| | 0% | 20% | 40% | 60% | 80% | 100% |
| $L_1$ | 1.02 | 1.07 | 1.08 | 1.09 | 1.12 | 1.13 |
| $L_\infty$ | 2 | 2.1 | 2.1 | 2.12 | 2.12 | 2.12 |
| σ | 0.1 | 0.12 | 0.12 | 0.12 | 0.13 | 0.13 |

The inventive framework propagates a monotonically advancing front from a point source $P_s$, which belongs to the curve skeletons of the object. Then, the resultant field has absolutely one global minimum that is the arrival time of $P_s$, which is set initially to zero. Recall also that the GVF is a smooth vector field, whose magnitude does not form medial surfaces for general shapes due to the nature of the diffusion process. Then, the computed curve skeleton extraction framework is found to possess the following features, which are agreed widely to be the features that an ideal curve skeleton method should possess.

Centeredness: an energy that is a function of some medialness is derived such that the minimum cost path between two medial voxels in the object is a curve skeleton, and hence centeredness is guaranteed.

Connectedness: Each curve skeleton is extracted by following the steepest descent direction in a monotonic field until either $P_s$ is reached or a previously extracted path is visited. Therefore, connectedness is guaranteed.

Thin: Each curve skeleton is extracted by moving from one of the topological nodes of the object's boundary in a monotonic decent field towards the point source, and hence can not self intersect. Otherwise, it is moving in the ascent direction (contradiction).

Continuous: Each curve skeleton is computed by solving an ODE, resulting in a sub-voxel accurate solution.

Topology Preserving: The homotopy or topology preserving is not guaranteed if the object contains tunnels (i.e., a cup), which is a limitation of any curve skeleton extraction method. Also, the inventive framework computes only those curve skeletons that originate from the salient features of the object's boundary.

Hierarchical: The framework extracts the curve skeletons of an object one at a time, resulting in a graph at no additional cost.

Robustness to Noise: Experimental results have shown that the framework is highly less sensitive to boundary noise because the LSG considers the starting voxel of each curve skeleton as the center of each extreme cluster rather than every salient boundary point. In addition, the GVF potential function is very smooth even if the boundary is noisy.

The present invention provides a variational framework for computing continuous curve skeletons from volumetric objects. Both the accuracy and robustness of the inventive framework have been validated against competing techniques as well as several 3D objects of different complexity. In addition to the desirable features that the computed curve skeletons possess such as centeredness, connectedness, and thinness, the inventive framework differs from related techniques in the followings: (1) extracts continuous curve skeletons from discrete objects in very reasonable time, (2) is the first level set-based extraction technique with derived speed functions, (3) is completely automated because all its parameters are analytically derived, (4) has high immunity to boundary noise, (5) does not require medial junctions to be computed and then classified to compute curve skeletons, and finally (6) does not require voxels to be isotropic.

The inventive framework (software assumes that the object is both segmented and connected. If the object is disconnected into several parts, then the framework extract the curve skeletons of each part independently. Also, if it contains bubbles that are formed by noise, the framework first fills them using a simple 3D filling algorithm. See, e.g., F. J. Hill, Computer Graphics Using OpenGL. Prentice Hall PTR, 2000.

As artisans will appreciate from the above discussion, an inventive embodiment curve skeleton extraction framework (software) for either tubular or general objects includes steps as follows: (1) Construct the distance transform $D(x)$, (2) Compute the point source Ps, (3) Propagate a $\beta$-front from $P_s$ and solve for the new distance field $D_1(x)$, (4) Discretize $D_1(x)$ to obtain $\hat{D}_1(x)$ and then construct the LSG, (5) Identify extreme and merging nodes, (6) Propagate an $\alpha$-front from $P_s$ and solve for the new distance field $D_2(x)$, (7) If the object contains loops, extract their CS, and finally, (8) Extract those CS that originate from extreme nodes and end with either a $P_s$ or end on a previously extracted path. FIGS. 10(a)-10(f) graphically illustrates some of those steps. Specifically, FIGS. 10(a)-10(f) graphically illustrate steps of a preferred embodiment of the invention for representing a leaf shape with a curver skeleton. FIG. 10(a) shows a leaf object, and FIG. 10(b) includes an arrow identifying the point source $P_s$ and the Euclidean distance field. FIG. 10(c) shows propagation of the $\beta$-front from $P_s$ and FIG. 10(d) shows the level set graph LSG. FIG. 10(e) shows an $\alpha$-front propagated from $P_s$ and 10(f) shows that the curve skeleton is the locus of front points with maximum possible curvature.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for computing continuous curve skeletons from image data of an object, the method comprising steps of:
   from 3D data, an object's medial voxel is selected automatically and is considered as a point source;
   transmiting a wave front ($\beta$-front) that evolves over time and traverses the object's domain, where the motion of the front is governed by the Eikonal equation where
   a wave front speed inversely proportional to the first energy function is initially transmitted to explore the object's domain and to extract the object's salient topological information, then
   transmitting another wave front ($\alpha$-front), whose speed is inversely proportional to the second energy function such that curve skeletons intersect the propagating fronts of those voxels of maximum positive curvatures,
   curve skeletons are computed by tracking them, starting from each computed salient topological node until a point source is reached or previously computed curve skeleton is intersected, by solving an ordinary differential equation numerically.

2. The method of claim 1, wherein the first energy function is generated from a Euclidean distance field and the second energy function is generated from a modified version of the magnitude of a gradient vector flow.

3. The method of claim 2, wherein the first energy function controls the identification of topological nodes of the shape from which curve skeletons start and the second one controls the extraction of the curve skeletons.

4. A method for computing continuous curve skeletons from image data of an object, the method comprising steps of:
   from 2D or 3D data, an object's medial voxel is selected automatically and is considered as a point source;
   transmiting a wave front ($\beta$-front) that evolves over time and traverses the object's domain, where the motion of the front is governed by the Eikonal equation where
   a wave front speed inversely proportional to the first energy function is initially transmitted to explore the object's domain and to extract the object's salient topological information, then
   transmitting another wave front ($\alpha$-front), whose speed is inversely proportional to the second energy function such that curve skeletons intersect the propagating fronts of those voxels of maximum positive curvatures,
   curve skeletons are computed by tracking them, starting from each computed salient topological node until a point source is reached or previously computed curve skeleton is intersected, by solving an ordinary differential equation numerically, wherein
   the first energy function is generated from a Euclidean distance field and the second energy function is generated from a modified version of the magnitude of a gradient vector flow, and
   wherein the gradient vector flow is determined according to $\lambda_2(x)=\max(|V|^q)-|V(x)|^q$ $q<1$, where $|V|$ is the magnitude of the gradient vector flow, q is the field strength, and x is a voxel.

5. A method for computing continuous curve skeletons from image data of an object, the method comprising steps of:
   from 2D or 3D data, an object's medial voxel is selected automatically and is considered as a point source;
   transmiting a wave front ($\beta$-front) that evolves over time and traverses the object's domain, where the motion of the front is governed by the Eikonal equation where
   a wave front speed inversely proportional to the first energy function is initially transmitted to explore the object's domain and to extract the object's salient topological information, then
   transmitting another wave front ($\alpha$-front), whose speed is inversely proportional to the second energy function such that curve skeletons intersect the propagating fronts of those voxels of maximum positive curvatures,
   curve skeletons are computed by tracking them, starting from each computed salient topological node until a point source is reached or previously computed curve skeleton is intersected, by solving an ordinary differential equation numerically, wherein the medial voxel is automatically selected according to $P_s=\arg_x\max\lambda_2(x)$, where $P_s$ is the point source and $\lambda_2(x)$ is proposed medialness using the modified version of the magnitude of the gradient vector flow.

6. A method for computing continuous curve skeletons from image data of an object, the method comprising steps of:
   receiving segmented 3D data regarding a shape of an object;
   computing a gradient vector flow over the object;
   computing a first cost field that is a function of the gradient vector flow;

computing a distance field over the object;

automatically selecting a point source inside that object by finding a point contained in both of the distance field and the cost field and having a global maximum in the cost field;

propagating a wave front from the point source that is a function of the distance field to compute a second cost field;

quantizing the second cost field to form a topology graph that describes the shape identifies shape end points and shape loops;

propagating a wave front that is a function of the first cost field over the topology graph to produce a third cost field; and extracting a curve skeleton from the third cost field by applying gradient descent over the third cost field.

7. The method of claim 6, wherein said automatically selecting a reference point selects a point with a maximum in the distance field if there is more than one point having a global maximum in the cost field.

* * * * *

UNITED STATES PATENT AND TRADEMARK OFFICE
CERTIFICATE OF CORRECTION

| | |
|---|---|
| PATENT NO. | : 8,041,141 B2 |
| APPLICATION NO. | : 11/823738 |
| DATED | : October 18, 2011 |
| INVENTOR(S) | : Aly A. Farag et al. |

Figure 1B:
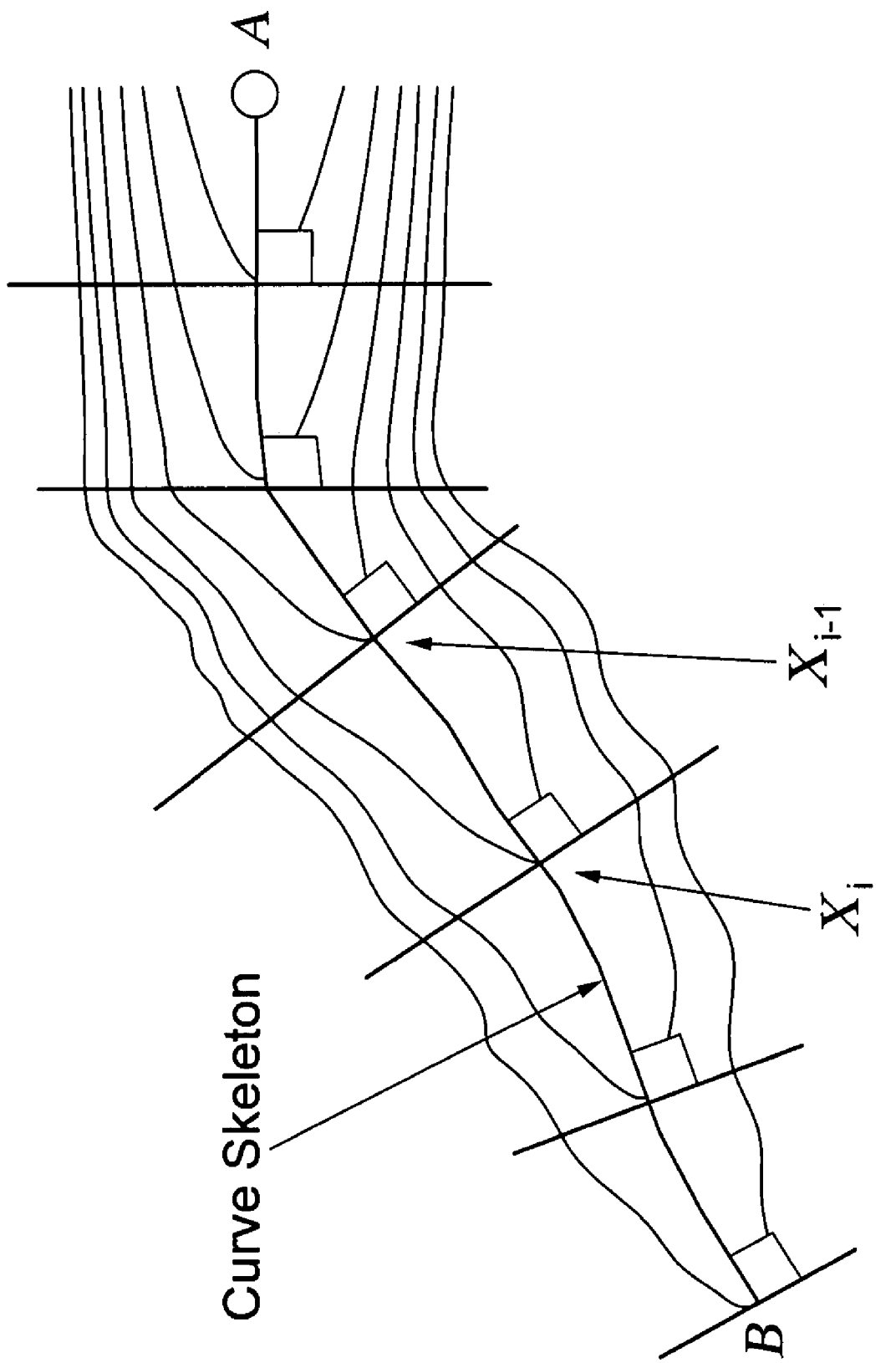
FIG. 1(b) shows how a curve skeleton intersects the propagating wave fronts at those points of maximum positive curvatures $X_i$, $X_{i-1}$, etc.

It is certified that error appears in the above-identified patent and that said Letters Patent is hereby corrected as shown below:

In the Specification:

| | |
|---|---|
| Col. 5, line 24 | Please delete "2(a) and 2(d)" and insert --2(a)-2(d)-- therefor. |
| Col. 5, lines 47-48 | Please delete "0.2, 0.05, 0.0125, and 1.0" and insert --0.2, 0.1, 0.05, and 0.025-- therefor. |
| Col. 5, lines 55-56 | Please delete "dembodiment" and insert --embodiment-- therefor. |
| Col. 5, lines 55-56 | Please delete "curver" and insert --curve-- therefor. |
| Col. 7, line 42 | Please delete "$T(x) = \min_{\gamma_{Ax}} \int_A u(\gamma(s))ds$" and insert -- $T(x) = \min_{\gamma_{Ax}} \int_A^x u(\gamma(s))ds$ -- therefor. |
| Col. 8, line 23 | Please delete "1(a)" and insert --FIG. 1(a)-- therefor. |
| Col. 8, line 25 | After "where", please insert a space between "$C_i$" and --$\epsilon$--. |
| Col. 8, line 28 | Please insert a space between "$C_i$" and "at". |
| Col. 8, lines 28-29 | Please delete "$t_O$, $t_O + \Delta t_x$, and $t_O + \Delta t_{C_i}$" and insert --$t_0$, $t_0 + \Lambda t_x$, and $t_0 + \Delta t_{C_i}$-- therefor. |
| Col. 8, line 64 | Please delete "$\epsilon(O;x)/\epsilon(O,C_i)$" and insert --$\epsilon(O,x)/\epsilon(O,C_i)$-- therefor. |
| Col. 9, line 32 | Before "very small", please delete "s" and insert --is-- therefor. |
| Col. 9, line 35 | Please delete "Eq, (12)" and insert --Eq. (12)-- therefor. |
| Col. 10, line 3 | Please delete "$F(x) > \exp(\alpha_i \lambda)(x) - \zeta) = \exp(-\zeta)\exp(\alpha_i \lambda(x))$" and insert --$F(x) \cdot \exp(\alpha_i \lambda(x) - \zeta) = \exp(-\zeta)\exp(\alpha_i \lambda(x))$-- therefor. |
| Col. 10, line 66 | Please delete "1(b)" and insert --FIG. 1(b)-- therefor. |

Signed and Sealed this
Twenty-fourth Day of April, 2012

David J. Kappos
*Director of the United States Patent and Trademark Office*

CERTIFICATE OF CORRECTION (continued)

U.S. Pat. No. 8,041,141 B2

| | |
|---|---|
| Col. 11, line 21 | Please delete " $f(P_n) = -\frac{\nabla T(P_n)}{|\nabla T(P_n)|}, k_1 = f(P_n), k_2 = f\left(P_n + \frac{h}{2}k_1\right)$ " and insert -- $f(P_n) = -\frac{\nabla T(P_n)}{\nabla T(P_n)}, k_1 = f(P_n), k_2 = f(P_n - \frac{h}{2}k_1)$ -- therefor. |
| Col. 11, line 61 | Please insert a space between "µ" and --is--. |
| Col. 12, line 10 | Please delete " $v(x,t+1) - v(x,t) + \Delta t(\mu \nabla^2 v(x,t)(v(x) - f_v(x)) \cdot \nabla f(x)|^2)$ " and insert -- $v(x,t-1) = v(x,t) - \Delta t(\mu \nabla^2 v(x,t) - (v(x) - f_v(x)) \nabla f(x)^2)$ -- therefor. |
| Col. 12, line 32 | Please delete "4(a)" and insert --FIG. 4(a)-- therefor. |
| Col. 12, line 35 | Please delete " $\lambda_2(x) = \max(|V|^q) - |V(x)|^q < 1$ " and insert -- $\lambda_2(x) = \max(V^q) - V(x)^q, q < 1$ -- therefor. |
| Col. 13, line 1 | Please delete "expression for 6" and insert --expression for δ-- therefor. |
| Col. 13, line 62 | Please delete "D,(x)" and insert --D₁(x)-- therefor. |
| Col. 13, line 64 | Please delete " $\hat{D}D_1(x) = \text{round}(D_1(x))$ " and insert -- $\hat{D}_1(x) = \text{round}(D_1(x))$ -- therefor. |
| Col. 14, line 19 | Please delete "," after "same $\hat{D}_1$ ". |
| Col. 14, line 40 | Please delete "P." and insert --P$_s$-- therefor. |
| Col. 14, line 60 | Please delete " $\tau \leq \frac{\varepsilon(x_{i-1}, x_i)}{\exp(\beta\lambda(x_i))}$ " and insert -- $\tau \leq \frac{\varepsilon(x_{i-1}, x_i)}{\exp(\beta\lambda(x_i))}$ -- therefor. |
| Col. 15, line 15 | After "loops.", please delete "if" and insert --If-- therefor. |
| Col. 15, line 28 | Please delete "s2" and insert --s$_2$-- therefor. |
| Col. 15, line 37 | Please delete "(MSFM). See, e.g." and insert --(MSFM), see, e.g.-- therefor. |
| Col. 15, line 45 | Please delete "0(n)" and insert --O(n)-- therefor. |
| Col. 15, line 62 | Please delete "FIG. 11 shows" and insert --FIGS. 6(a)-6(c) show-- therefor. |
| Col. 15, line 64 | After "Estimation of", please delete "a" and insert --α-- therefor. |
| Col. 15, line 66 | After "The parameter", please delete "a" and insert --α-- therefor. |
| Col. 16, line 2 | Please delete " $\alpha_c = \frac{1}{\delta} \ln\left(\frac{\sqrt{\Delta^2 x + \Delta^2 y + \Delta^2 z}}{\min(\Delta x, \Delta y, \Delta z)}\right)$ " and |

CERTIFICATE OF CORRECTION (continued)
U.S. Pat. No. 8,041,141 B2

| | |
|---|---|
| | insert -- $\alpha_c = \frac{1}{\delta} \ln\left( \frac{\sqrt{\Delta^2 x + \Delta^2 y + \Delta^2 z}}{\min(\Delta x, \Delta y, \Delta z)} \right)$ -- therefor. |
| Col. 16, line 18 | Before "for tubular", please delete "a" and insert --α-- therefor. |
| Col. 16, line 19 | Before "from 0 to 1", please delete "a" and insert --α-- therefor. |
| Col. 16, line 19 | Please delete "L," and insert --$L_1$-- therefor. |
| Col. 16, line 21 | Please insert a space between "α" and --as--. |
| Col. 16, line 22 | Please delete "Rα" and insert --$R_\alpha$-- therefor. |
| Col. 16, line 25 | Please delete "L," and insert --$L_1$-- therefor. |
| Col. 16, line 28 | Please delete "$\alpha_c < \alpha < 1.0$." and insert --$\alpha_c \leq \alpha \leq 1.0$-- therefor. |
| Col. 16, line 29 | After "Estimation of", please delete "a" and insert --α-- therefor. |
| Col. 16, line 40 | Please delete "Rα" and insert --$R_\alpha$-- therefor. |
| Col. 16, line 41 | After "range for", please delete "a" and insert --α-- therefor. |
| Col. 17, line 27 | Please delete "voxels;" and insert --voxels:-- therefor. |
| Col. 17, line 28 | Please delete "Let $N_1$" and insert --Let $N_l$-- therefor. |
| Col. 17, line 31 | Please delete "BV×$N_1$ and insert --BV×$N_l$-- therefor. |
| Col. 17, line 36 | Please delete "By setting $N_1$" and insert --By setting $N_l$-- therefor. |
| Col. 17, line 40 | Please delete "deviation a" and insert --deviation σ-- therefor. |
| Col. 17, line 50 | Please delete "FIGS. 9(a)-9(e)" and insert --FIGS. 9(a)-9(c)-- therefor. |
| Col. 17, line 53 | Please delete "$N_1$=100%" and insert --$N_l$=100%-- therefor. |
| Col. 19, line 3 | Please delete "(software" and insert --software-- therefor. |
| Col. 19, line 15 | Please delete "Ps" and insert --$P_s$-- therefor. |
| Col. 19, line 26 | Please delete "curver skeleton" and insert --curve skeleton-- therefor. |
| Col. 19, line 31 | Please delete "10(f)" and insert --FIG. 10(f)-- therefor. |
| Col. 19, line 48<br>claim 1, line 5<br>Col. 20, line 10 | Please delete "transmiting" and insert --transmitting-- therefor. |
| claim 4, line 5<br>Col. 20, line 39 | Please delete "transmiting" and insert --transmitting-- therefor. |
| claim 5, line 5<br>Col. 21, line 7 | Please delete "transmiting" and insert --transmitting-- therefor. |
| claim 6, line 17 | After "describe the shape", please insert --and-- therefor. |